United States Patent
Kuno

(10) Patent No.: US 8,964,242 B2
(45) Date of Patent: Feb. 24, 2015

(54) PRINT CONTROLLER GENERATING PRINT DATA CAUSING PRINT EXECUTING UNIT TO PERFORM PRINTING OPERATION

(71) Applicant: Masashi Kuno, Obu (JP)

(72) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,923

(22) Filed: Sep. 27, 2013

(65) Prior Publication Data
US 2014/0176966 A1    Jun. 26, 2014

(30) Foreign Application Priority Data

Dec. 26, 2012  (JP) ................................ 2012-282316

(51) Int. Cl.
G06K 15/10 (2006.01)
B41J 2/15 (2006.01)
B41J 2/145 (2006.01)

(52) U.S. Cl.
CPC .................. G06K 15/105 (2013.01)
USPC ................. 358/1.8; 347/40; 347/41

(58) Field of Classification Search
None
See application file for complete search history.

(56) References Cited

U.S. PATENT DOCUMENTS

| 7,665,818 | B2 | 2/2010 | Yoshida | |
|---|---|---|---|---|
| 2003/0048326 | A1* | 3/2003 | Yamasaki et al. | 347/41 |
| 2007/0046725 | A1* | 3/2007 | Hoshiyama et al. | 347/40 |
| 2007/0076035 | A1 | 4/2007 | Yoshida | |

FOREIGN PATENT DOCUMENTS

| JP | 2002-283543 A | 10/2002 |
|---|---|---|
| JP | 2006-027131 A | 2/2006 |
| JP | 2007-098623 A | 4/2007 |

* cited by examiner

*Primary Examiner* — Fan Zhang
(74) *Attorney, Agent, or Firm* — Banner & Witcoff, Ltd.

(57) ABSTRACT

A print controller controls a print executing unit having a print head in which L nozzles are arranged in a first direction. A pitch of first nozzles in the first direction is set to a first predetermined nozzle pitch. The print controller generates print data based on image data. The print data causes the print executing unit to execute N pass printing. A pitch of lines formed through N pass printing is one N-th of the first predetermined nozzle pitch. At least one of the L number of first nozzles is unused for forming dots on the printing medium in each pass printing. Combinations of the first nozzles used in the N number of pass processes are different from one another. A movement distance of the print head when the first moving process is executed once is different from that when the second moving process is executed once.

14 Claims, 14 Drawing Sheets

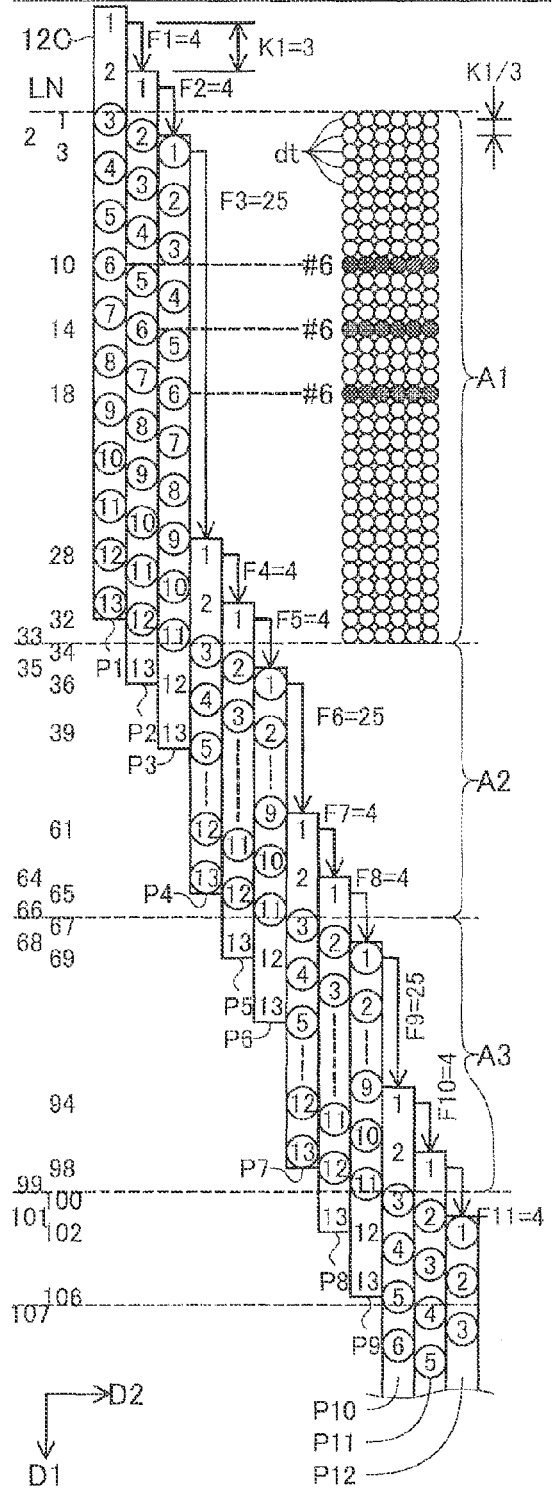
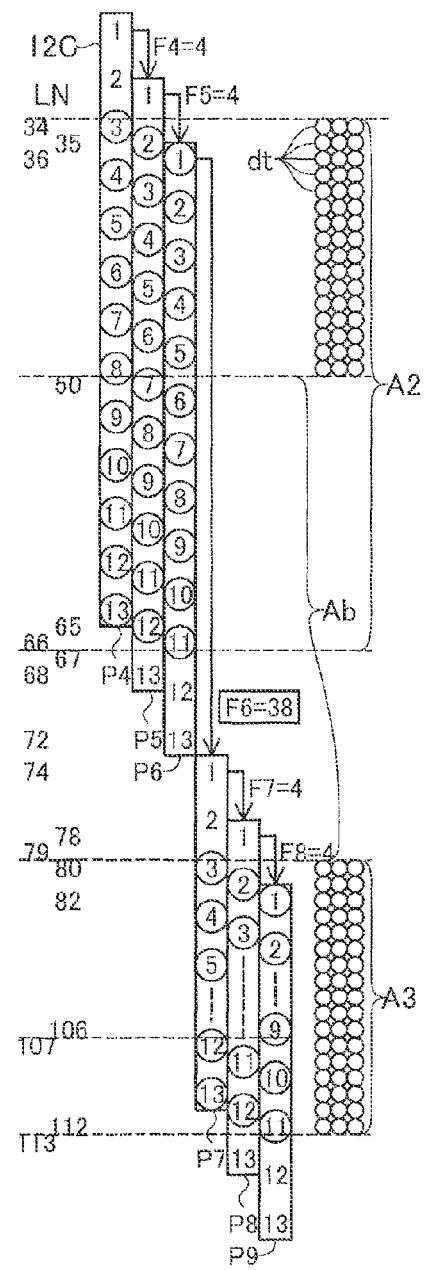
FIG. 5A FIRST NONUNIFORM PARTIAL NOZZLE PATTERN
FIG. 5B

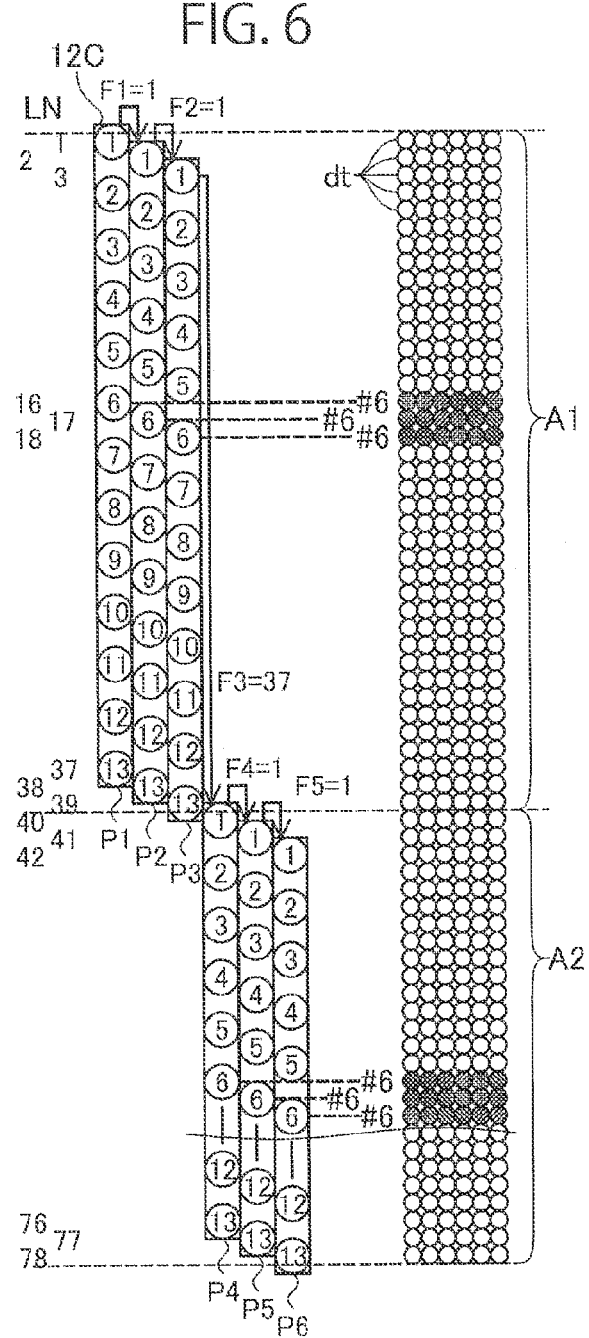

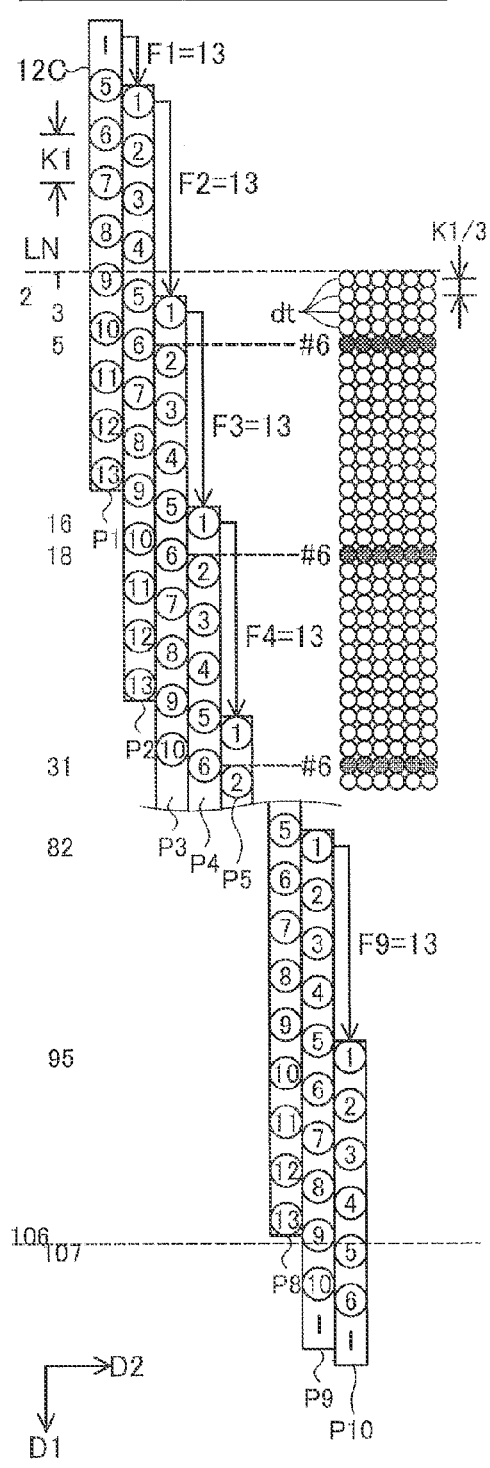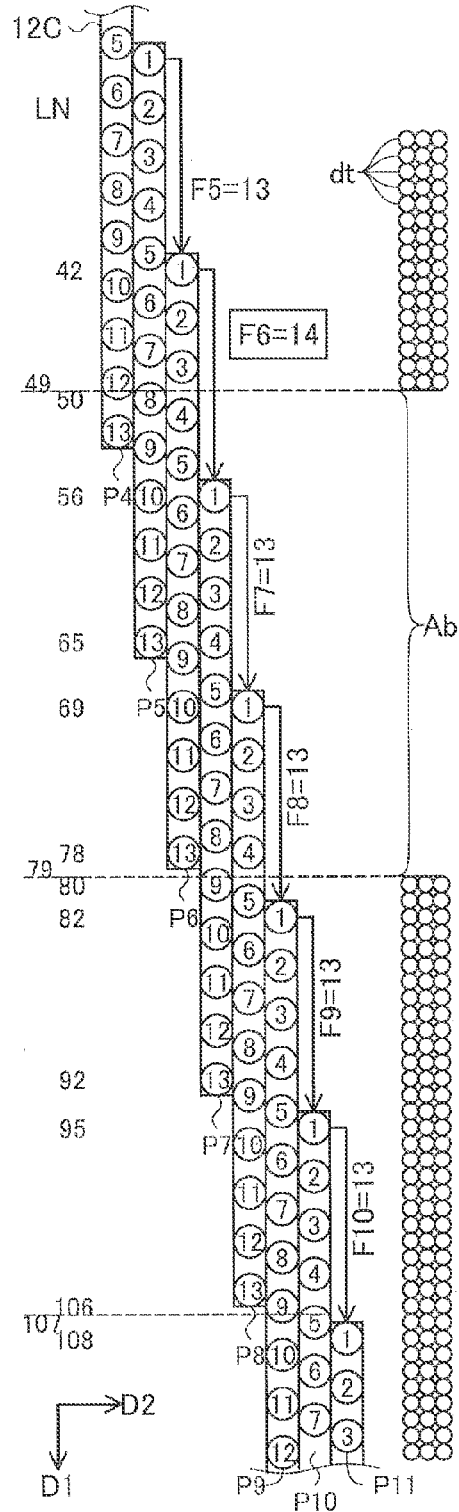
FIG. 9A UNIFORM TOTAL NOZZLE PATTERN
FIG. 9B

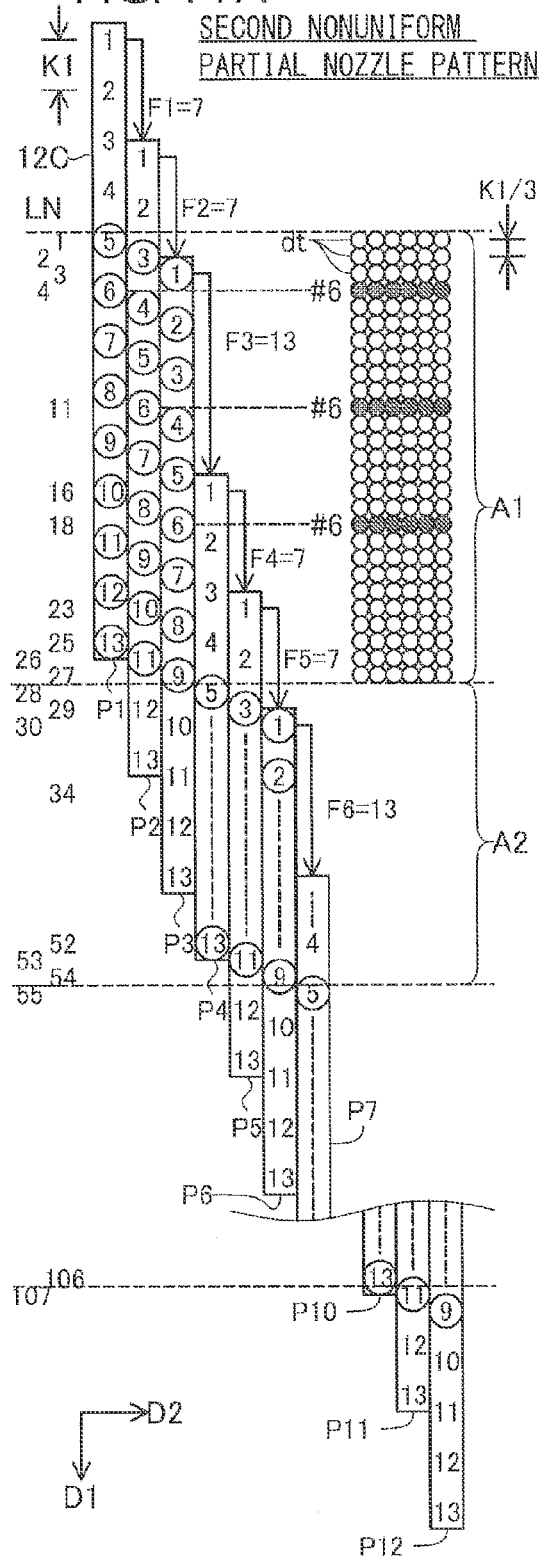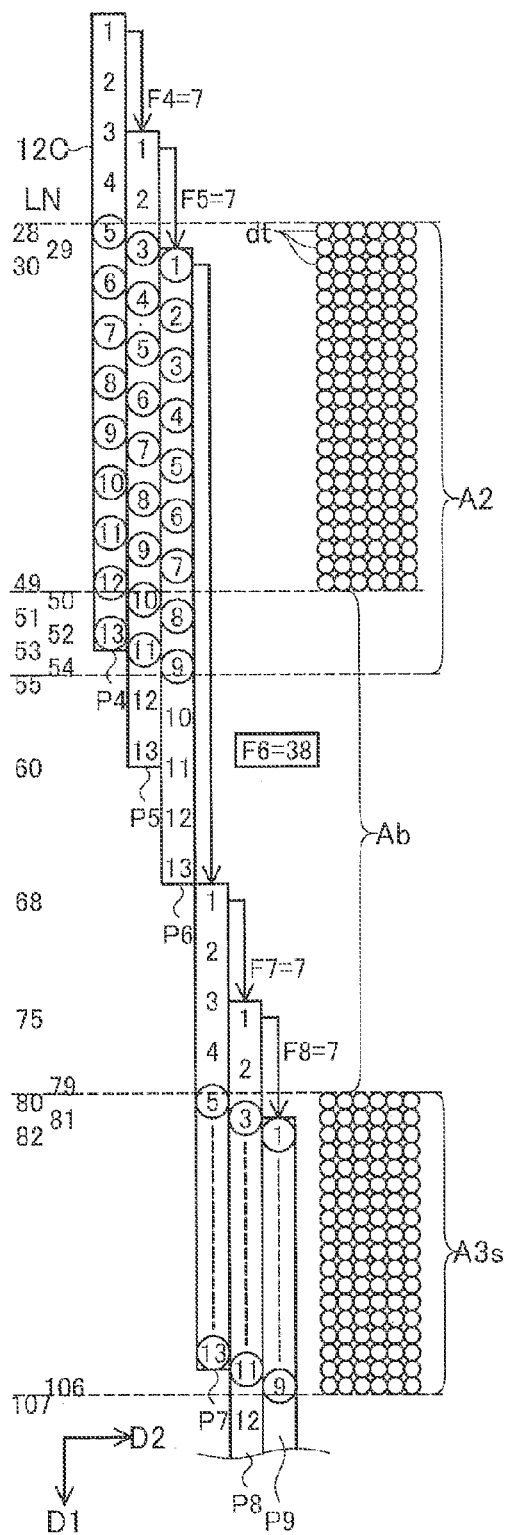
FIG. 11A / FIG. 11B

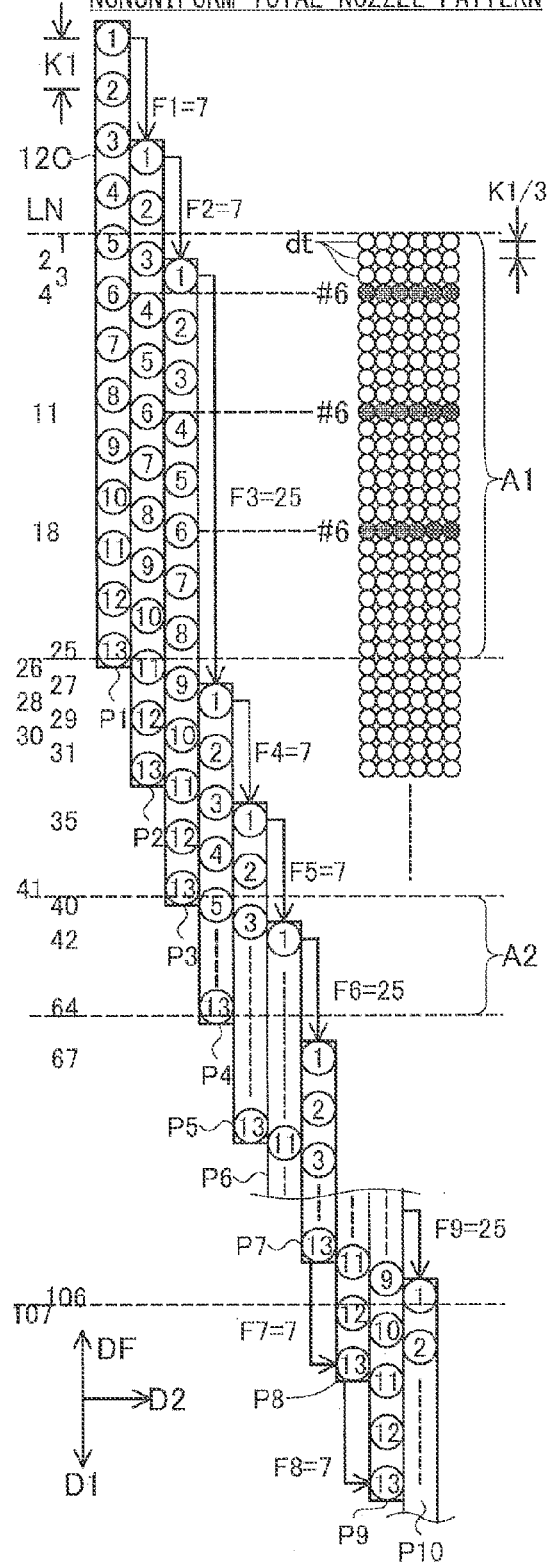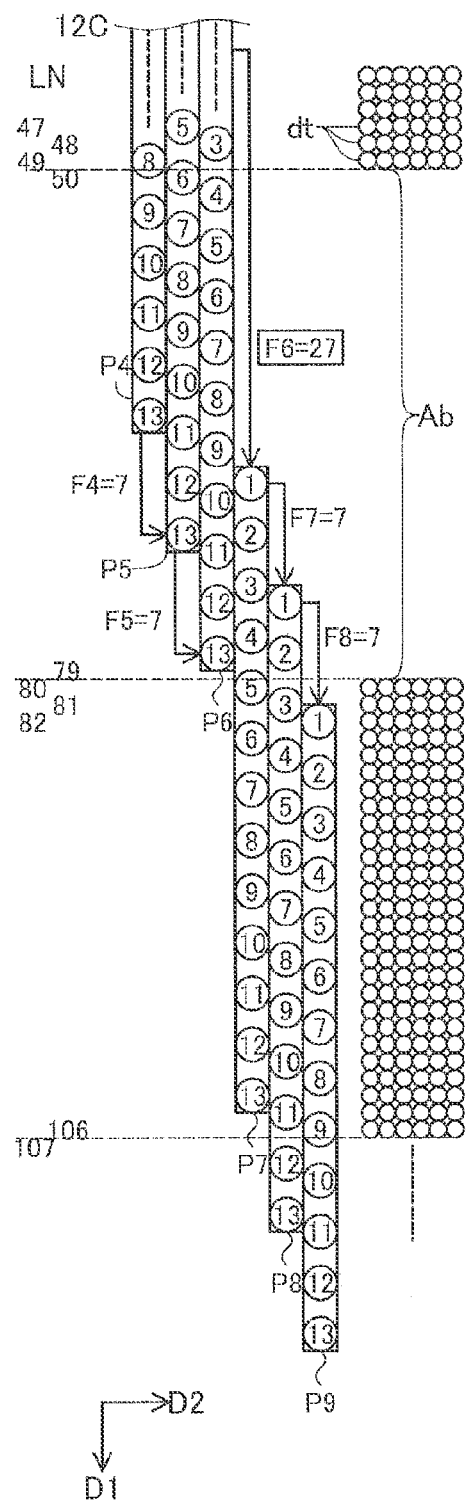

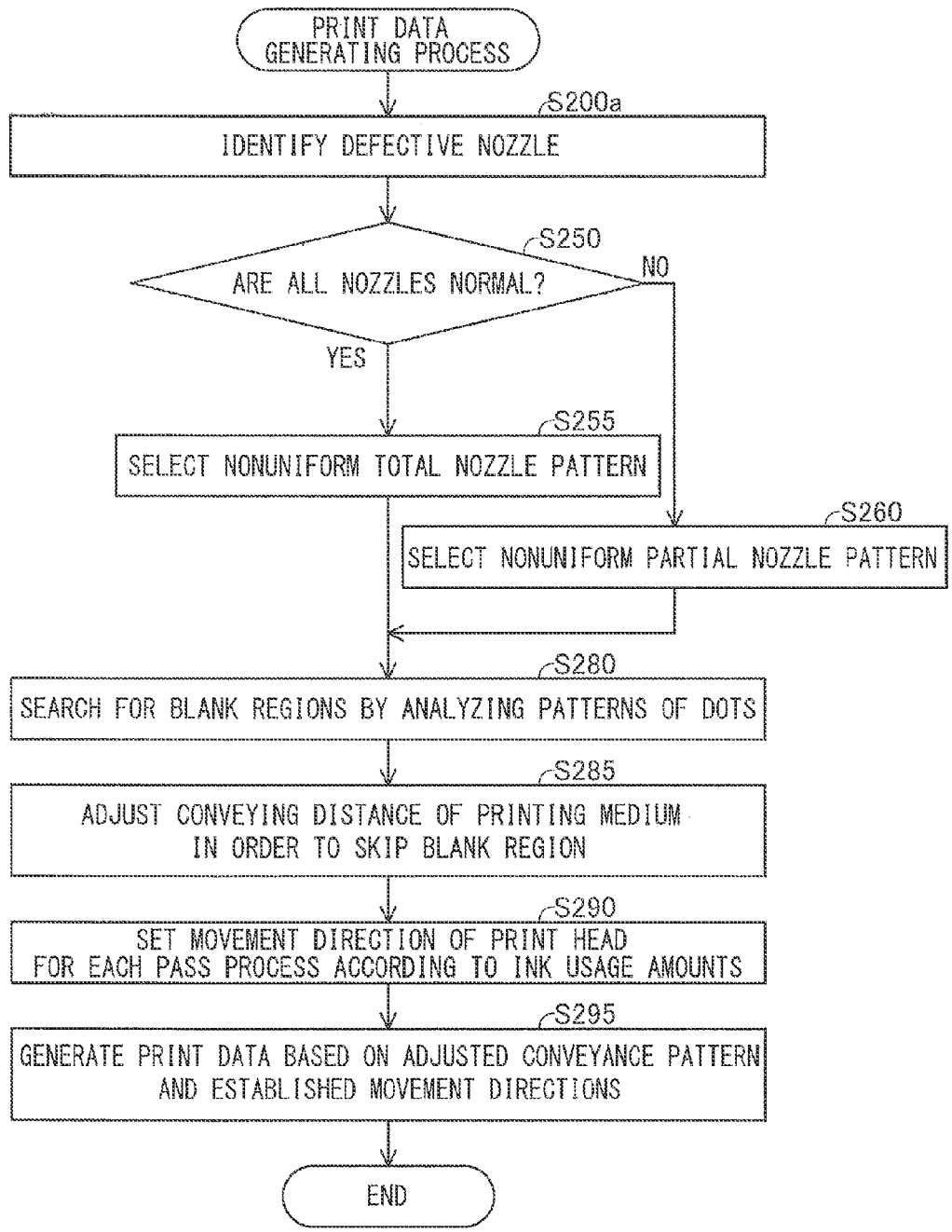

PRINT CONTROLLER GENERATING PRINT DATA CAUSING PRINT EXECUTING UNIT TO PERFORM PRINTING OPERATION

CROSS REFERENCE TO RELATED APPLICATION

This application claims priority from Japanese Patent Application No. 2012-282316 filed Dec. 26, 2012. The entire content of the priority application is incorporated herein by reference.

TECHNICAL FIELD

The present invention relates to a print controller.

BACKGROUND

Conventional printers have ejected ink droplets through nozzles in order to form ink dots on a printing medium. One such printer known in the art alternates between an operation to eject ink droplets from the nozzles and to form ink dots while moving the print head possessing the nozzles in a main scanning direction, and an operation to convey the printing medium in a sub scanning direction orthogonal to the main scanning direction. Further, in order to prevent the occurrence of periodic streaks (called "banding") in the main scanning direction, there has also been proposed a technique for varying the conveying distance so that the distance of each main scanning operation is different from the distance used in the previous main scanning operation (Japanese Patent Application Publication No. 2006-27131, for example).

SUMMARY

However, various printing-related problems can occur when printing images with a combination of operations to form ink dots with a moving print head and operations to convey the printing medium. For example, a longer time may be required to complete a printing operation when employing a configuration designed to improve image quality. Conversely, the image quality may suffer when employing a configuration designed to improve printing speed.

In view of the foregoing, it is an object of the invention to provide a print controller capable of suppressing, printing problems.

In order to attain the above and other objects, the invention provides a print controller configured to control a print executing unit. The print executing unit has a print head in which L number of first nozzles are arranged in a first direction. L is an integer of 2 or greater. A pitch of first nozzles in the first direction between neighboring two first nozzles of the L number of first nozzles is set to a first predetermined nozzle pitch. The print controller includes: an acquiring unit configured to acquire image data; and a print data generating unit configured to generate print data based on the image data. The print data generating unit includes a first drive control data generating unit configured to generate first drive control data based on the image data as the print data. The first drive control data causes the print executing unit to satisfy the following (a)-(d). (a) The print executing unit executes a printing process for a plurality of unit regions by alternately repeating a first unit printing process and a first moving process, the plurality of unit regions being defined in a printing medium and arranged in the first direction, each unit region having a prescribed length in the first direction. Each first unit printing process includes a second moving process and N number of pass processes for framing dots to form a plurality of lines on one of the plurality of unit regions. N is an integer of 2 or greater. Each of the plurality of lines extends in a second direction orthogonal to the first direction and includes at least one dot arranged in the second direction. In each of the N number of pass processes, the print head moves in the second direction relative to the printing medium to form dots on the printing medium along at least one line of the plurality of lines. In the second moving process, the print head moves in the first direction relative to the printing medium within a period of time after ath pass process of the N number of pass processes has been executed and before (a+1)th pass process of the N number of pass processes is executed, a is integer from one to (N−1). A pitch of lines in the first direction between neighboring two lines of the plurality of lines is one N-th of the pitch of first nozzles. The print executing unit executes, each time Nth pass processes has been executed in one first unit printing process, the first moving process in which the print head moves in the first direction relative to the printing medium. (b) At least one of the L number of first nozzles is unused for forming dots on the printing medium in each of the N number of pass processes. (c) Combinations of the first nozzles used for forming dots on the printing medium in the N number of pass processes are different from one another. (d) A movement distance of the print head relative to the printing medium when the first moving process is executed once is different from a movement distance of the print head relative to the printing medium when the second moving process is executed once.

According to another aspect, the present invention provides a non-transitory computer readable storage medium storing a set of program instructions installed on and executed by a computer configured to control a print executing unit. The print executing unit has a print head in which L number of first nozzles are arranged in a first direction. L is an integer of 2 or greater. A pitch of first nozzles in the first direction between neighboring two first nozzles of the L number of first nozzles is set to a first predetermined nozzle pitch. The program instructions includes: acquiring image data; and generating print data based on the image data causing the print executing unit to satisfy the following (a)-(d). (a) The print executing unit executes a printing process for a plurality of unit regions by alternately repeating a first unit printing process and a first moving process, the plurality of unit regions being defined in a printing medium and arranged in the first direction, each unit region having a prescribed length in the first direction. Each first unit printing process includes a second moving process and N number of pass processes for forming dots to form a plurality of lines on one of the plurality of unit regions. N is an integer of 2 or greater. Each of the plurality of lines extends in a second direction orthogonal to the first direction and includes at least one dot arranged in the second direction. In each of the N number of pass processes, the print head moves in the second direction relative to the printing medium to form dots on the printing medium along at least one line of the plurality of lines. In the second moving process, the print head moves in the first direction relative to the printing medium within a period of time after ath pass process of the N number of pass processes has been executed and before (a+1)th pass process of the N number of pass processes is executed. a is integer from one to (N−1). A pitch of lines in the first direction between neighboring two lines of the plurality of lines is one N-th of the pitch of first nozzles. The print executing unit executes, each time Nth pass processes has been executed in one first unit printing process, the first moving process in which the print head moves in the first direction relative to the printing medium. (b) At least one of the L number of first nozzles is unused for forming dots on the printing medium in each of the N number of pass processes. (c) Combinations of the first nozzles used for forming dots on the printing medium in the N number of pass processes are different from one another. (d) A movement distance of the print head relative to the printing medium when the first moving process is executed once is different from a movement distance of the print head relative to the printing medium when the second moving process is executed once.

BRIEF DESCRIPTION OF THE DRAWINGS

The particular features and advantages of the invention as well as other objects will become apparent from the following description taken in connection with the accompanying drawings, in which:

FIG. 5A is an explanatory diagram showing a first nonuniform partial nozzle pattern in the first embodiment;

FIG. 5B is an explanatory diagram showing an example of the first nonuniform partial nozzle pattern for a region including a blank region in the first embodiment;

FIG. 6 is an explanatory diagram showing a conveyance pattern in which a conveying distance in a conveying process performed between consecutive pass processes is 1;

FIG. 9A is an explanatory diagram showing a uniform total nozzle pattern;

FIG. 9B is an explanatory diagram showing an example of the uniform total nozzle pattern for a region including a blank region;

FIG. 11A is an explanatory diagram showing a second nonuniform partial nozzle pattern in a second embodiment;

FIG. 11B is an explanatory diagram showing an example of the second nonuniform partial nozzle pattern for a region including a blank region in the second embodiment;

FIG. 14A is an explanatory diagram showing a nonuniform total nozzle pattern in a fourth embodiment;

FIG. 14B is an explanatory diagram showing an example of the nonuniform total nozzle pattern for a region including a blank region in the fourth embodiment; and FIG. 15 is a flowchart illustrating steps in a print data generating unit according to the fourth embodiment.

DETAILED DESCRIPTION

A. First Embodiment

Figure 1:
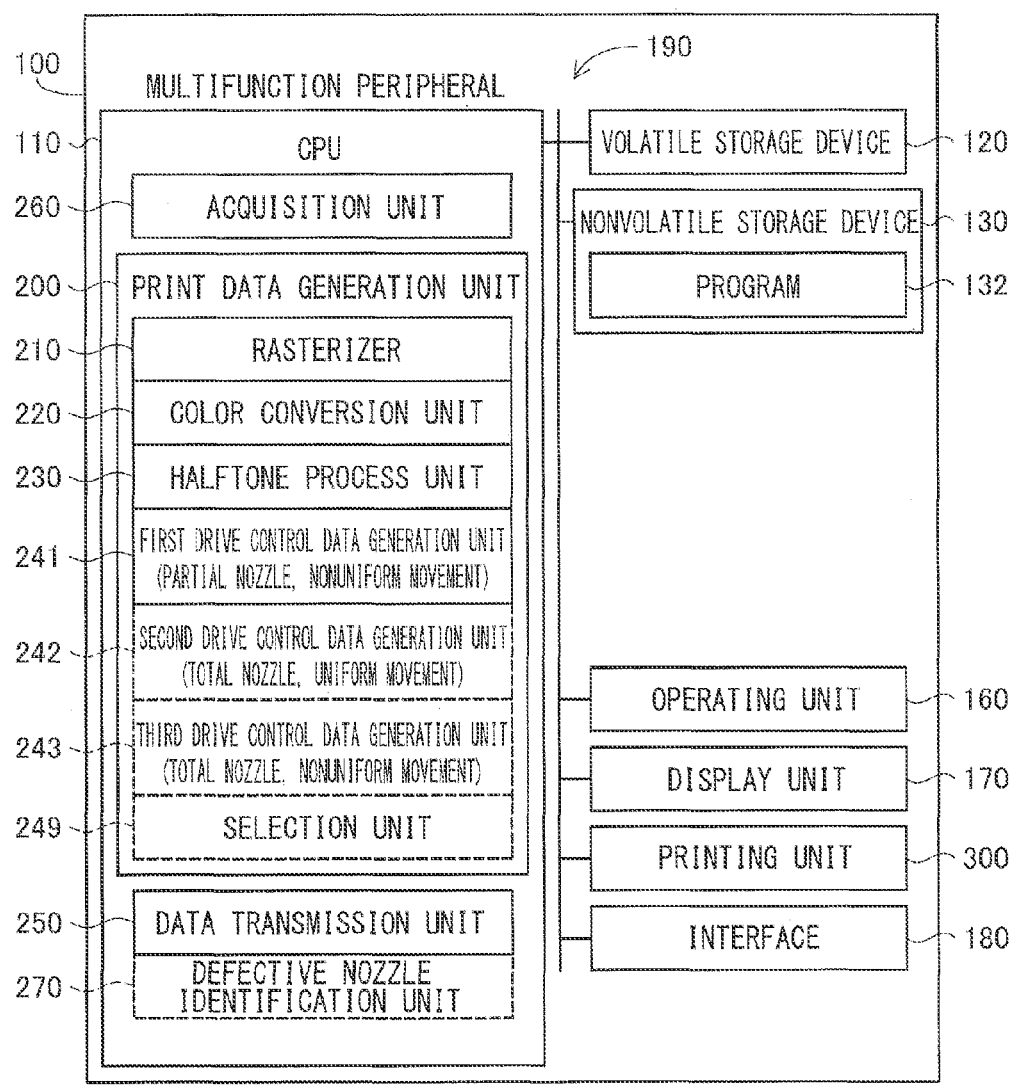
FIG. 1 is a block diagram of a multifunction peripheral according to a first embodiment of the present invention.

FIG. 1 is a block diagram of a multifunction peripheral 100 according to a first embodiment of the present invention. The multifunction peripheral 100 includes a CPU 110 for performing overall control of the multifunction peripheral 100, a volatile storage device 120 such as DRAM, a nonvolatile storage device 130 such as flash memory, an operating unit 160 (buttons and a touch panel, for example) operated by the user, a display unit 170 (a liquid crystal display, for example) for displaying images, a printing unit 300 for printing images on a recording medium such as paper, and an interface 180 for communicating with other devices (a network interface or USB interface, for example). The nonvolatile storage device 130 stores a program 132.

The CPU 110 executes the program 132 while using the volatile storage device 120 and nonvolatile storage device 130 in order to control the printing unit 300. Thus, the CPU 110, volatile storage device 120, and nonvolatile storage device 130 as a whole correspond to a print controller 190. As shown in FIG. 1, the CPU 110 functions as an acquisition unit 260, a print data generation unit 200, and a data transmission unit 250 (hereinafter, also referred to as "functional units"). The acquisition unit 260 acquires image data for a print target (hereinafter referred to as "input image data"). Hereinafter, the image represented by this input image data (i.e., the image to be printed) will be called the "target image." The print data generation unit 200 uses the input image data acquired by the acquisition unit 260 to generate print data for controlling the printing unit 300 to execute a printing operation. The data transmission unit 250 transmits the print data generated by the print data generation unit 200 to the printing unit 300. The print data generation unit 200 further includes a rasterizer 210, a color conversion unit 220, a halftone process unit 230, and a first drive control data generation unit 241 (hereinafter simply called a "first data generation unit 241"). These process units will be described later in greater detail.

Note that process units 242, 243, 249, and 270 denoted by boxes formed of dashed lines are used in subsequent embodiments. Specifically, the second drive control data generation unit 242 (hereinafter simply called a "second data generation unit 242") is provided in the print data generation unit 200 according to a third embodiment described later. Similarly, a third drive control data generation unit 243 (hereinafter simply called a "third data generation unit 243") is provided in the print data generation unit 200 according to a fourth embodiment described later. The selection unit 249 is provided in the print data generation unit 200 according to both the third and fourth embodiments. The defective nozzle identification unit 270 is provided in the print data generation unit 200 according to both the second and fourth embodiments. Hence, the process units 242, 243, 249, and 270 will be described later in their respective embodiments.

Figure 2:
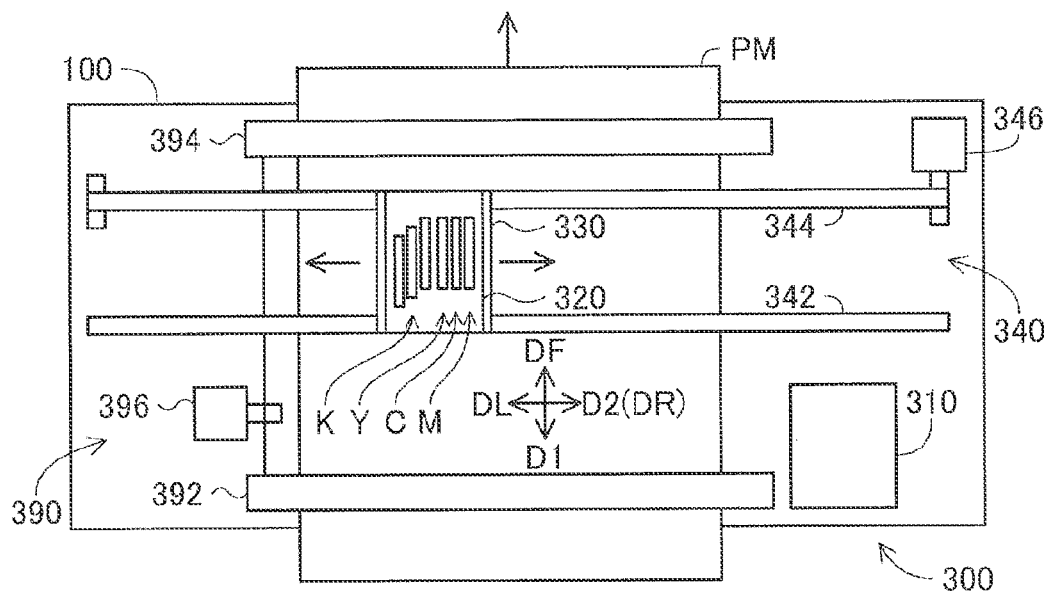
FIG. 2 is a schematic diagram showing the structure of a printing unit provided in the multifunction peripheral according to the first embodiment.

FIG. 2 is a schematic diagram showing the structure of the printing unit 300. In the first embodiment, the printing unit 300 is a device capable of printing color images using ink in the four colors black (K), cyan (C), magenta (M), and yellow (Y). The printing unit 300 includes a head-driving device 340, a medium-conveying device 390, and a drive circuit 310 that controls the head-driving device 340 and medium-conveying device 390 according to the print data.

The medium-conveying device 390 conveys a printing medium PM in a conveying direction DF. In the first embodiment, the medium-conveying device 390 includes a first roller 392, a second roller 394, and a first motor 396 for driving the rollers 392 and 394 to rotate. The rollers 392 and 394 rotate to convey the printing medium PM in the conveying direction DF.

The head-driving device 340 includes a print head 320, a carriage 330 for supporting the print head 320, a guide rail 342 that slidably retains the carriage 330, a belt 344 stretched taut in a direction parallel to the guide rail 342, and a second motor 346 for driving the belt 344. The carriage 330 is fixed to the belt 344 and is supported on the guide rail 342 so as to be capable of sliding in a direction D2 that intersects the conveying direction DF (hereinafter referred to as the scanning direction D2). Through the driving force of the second motor 346, the head-driving device 340 reciprocates the carriage 330, and the print head 320 mounted in the carriage 330, along the scanning direction D2.

In the following description, the direction opposite the conveying direction DF will be called a first direction D1, and the scanning direction D2 will be called a second direction D2. Thus, the print head 320 moves in the first direction D1 relative to the printing medium PM when the printing medium PM is conveyed in the conveying direction DF. In the first embodiment, the second direction D2 is orthogonal to the first direction D1. In the following description, the second direction D2 will also be called the right direction DR, and the direction opposite the second direction D2 will be called the left direction DL.

The print head 320 has a plurality of nozzles (not shown) for each of the ink colors (black, yellow, cyan, and magenta). The drive circuit 310 is connected to ink tanks (not shown). The head-driving device 340 drives the print head 320 to eject ink droplets through the nozzles toward the printing medium PM while conveying the print head 320 in the right direction DR or left direction DL (hereinafter called a pass process). Through a pass process, the print head 320 forms ink dots on the printing medium PM along a line extending in the second direction D2. The medium-conveying device 390 conveys the printing medium PM in the conveying direction DF between consecutive pass processes (hereinafter called a conveying process). A conveying process is performed to move the print head 320 relative to the printing medium PM in the first direction D1. By repeatedly performing the pass process and conveying process, the printing unit 300 prints an image on the printing medium PM.

Figure 3:
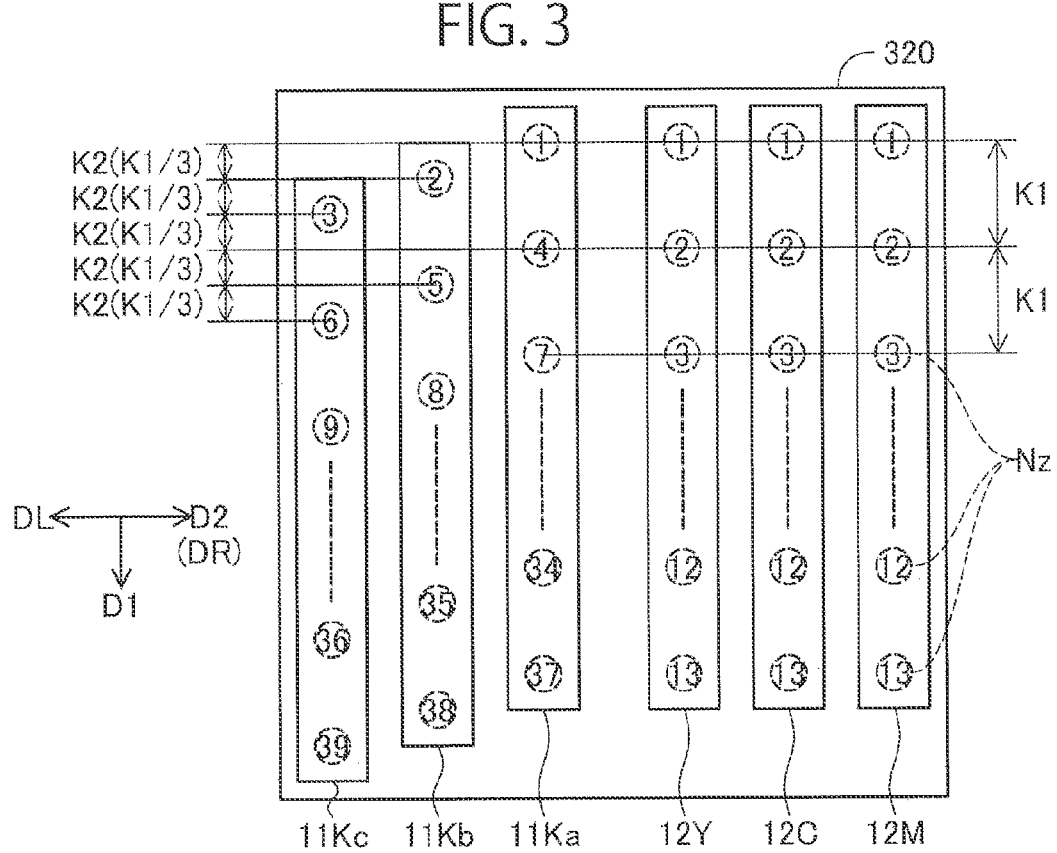
FIG. 3 is an explanatory diagram showing the arrangement of nozzles formed in the print head.

FIG. 3 is an explanatory diagram showing the arrangement of nozzles formed in the print head 320. The arrangement of the nozzles shown in FIG. 3 is imagined that the viewer is looking through the print head 320 toward the printing medium PM. The print head 320 has arranged in order from the side of the print head 320 in the left direction DL toward the side in the right direction DR (i.e., in the second direction D2), black head units 11Kc, 11Kb, and 11Ka; a yellow head unit 12Y for yellow ink; a cyan head unit 12C for cyan ink; and a magenta head unit 12M for magenta ink.

Each of the head units 11Kc, 11Kb, 11Ka, 12Y, 12C, and 12M has L (where L=13 in the first embodiment) nozzles Nz arranged at different positions in the first direction D1. The pitch of nozzles in the first direction D1 (the distance between any neighboring two nozzles Nz is a prescribed first nozzle pitch K1 (hereinafter called the first pitch K1). In FIG. 3, the L nozzles Nz are arranged along a single straight line extending in the first direction D1, but the L nozzles Nz may be distributed among a plurality of positions in the second direction D2. Further, the number L of nozzles is not limited to 13 but may be less than or greater than 13.

As shown in FIG. 3, the first black head unit 11Ka and the three head units 12Y, 12C, and 12M for color ink are arranged at the same positions along the first direction D1. Hence, in any single pass process, these head units 11Ka, 12Y, 12C, and 12M all form ink dots along the same lines extending in the second direction D2.

On the other hand, the second black head unit 11Kb is shifted a distance one-third of the first pitch K1 in the first direction D1 from the first black head unit 11Ka, and the third black head unit 11Kc is shifted a distance one-third of the first pitch K1 in the first direction D1 from the second black head unit 11Kb. Hence, the pitch in the first direction D1 (distance between any two neighboring nozzles Nz) for all 3×L nozzles Nz used for black ink is K1/3. This distance will be called the second nozzle pitch K2, or simply the second pitch K2.

The numbers indicated in each nozzle Nz denote the order of the nozzle along the first direction D1. These numbers are allocated for each ink color. Specifically, numbers from 1 to 13 are allocated for nozzles Nz in the yellow, cyan, and magenta head units 12Y, 12C, and 12M, while numbers from 1 to 39 are allocated for nozzles in the black head units 11Ka, 11Kb, and 11Kc.

In the first embodiment, the distance between dots along the first direction D1 (i.e., the printing resolution) is identical to the second pitch K2. When using color ink (cyan, magenta, and yellow), a printing resolution one-third of the first pitch K1 is achieved by performing three pass processes in the same region. This will be described later in greater detail.

The multifunction peripheral 100 according to the first embodiment performs bi-directional printing to reduce the time required for printing. That is, the print head 320 forms ink dots in cyan, magenta, and yellow when moving both in the right direction DR and in the left direction DL. When the print head 320 moves in the right direction DR, ink is superposed in the order magenta, cyan, and yellow. When the print head 320 moves in the left direction DL, ink is superposed in the order yellow, cyan, and magenta. The different order of superposing ink colors can make the colors of the printed image appear different, even when there is no change in the amount of ink used for each color. This disparity in the appearance of colors is particularly noticeable in dark regions, i.e., regions printed with large amounts of ink. In the first embodiment, the direction in which the print head 320 moves during a pass process is set to suppress noticeable differences in colors. This will be described later in greater detail.

Figure 4:
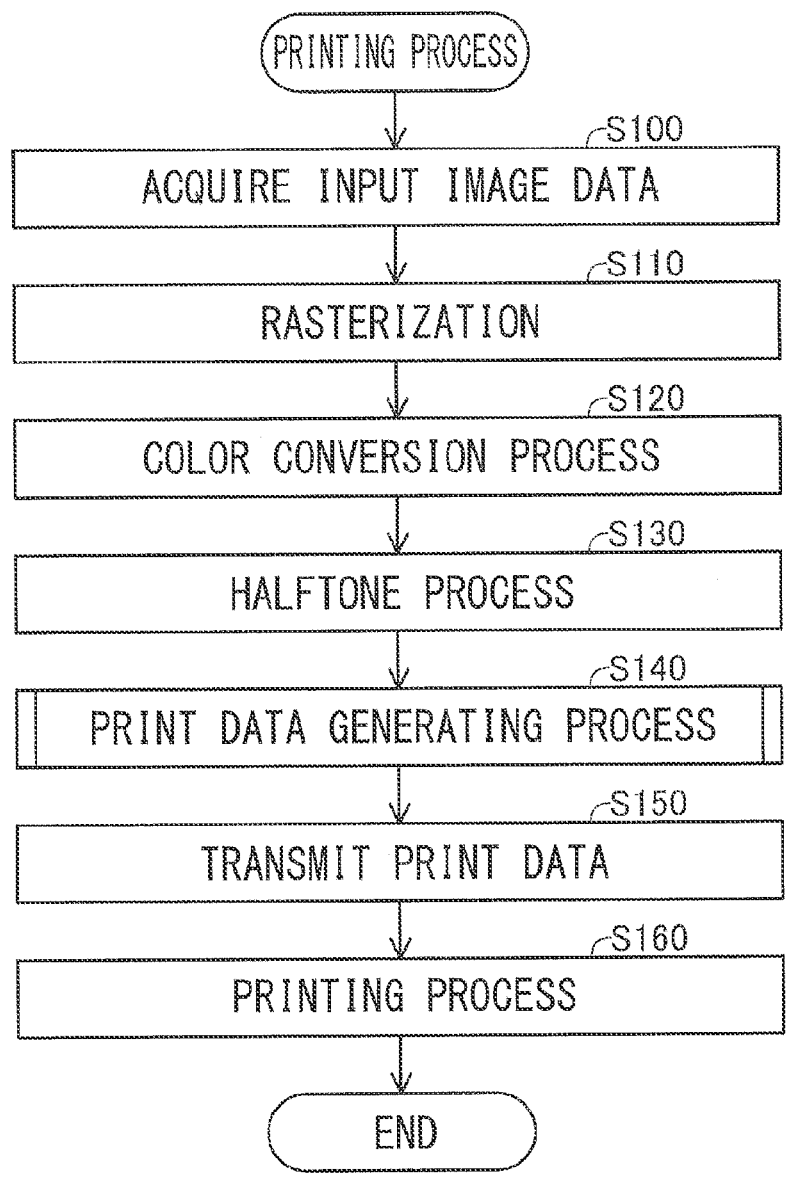
FIG. 4 is a flowchart illustrating steps in a printing process performed by the multifunction peripheral according to the first embodiment.

FIG. 4 is a flowchart illustrating steps in a printing process performed by the CPU 110 (see FIG. 1) of the multifunction peripheral 100. The CPU 110 begins the process in FIG. 4 in response to a print command from the user. The user inputs a print command into the multifunction peripheral 100 by performing operations on the operating unit 160.

In S100 the acquisition unit 260 acquires input image data based on instructions from the user. The acquisition unit 260 acquires this input image data from USB memory connected to the interface 180, for example. The input image data may be JPEG data or document data, for example.

In S110 the rasterizer 210 (see FIG. 1) converts the input image data to bitmap data of a resolution suited to the printing process. The process for converting image data to bitmap data of the printing resolution is called rasterization. The bitmap data generated in S110 expresses the color for each of a plurality of pixels (hereinafter called "print pixels"). For example, each of the print pixels may be expressed by a gradation value (one of 256 levels, for example) for each of the three color components red (R), green (G), and blue B. The bitmap data generated in S110 represents the same target image represented by the input image data.

In S120 the color conversion unit 220 (see FIG. 1) executes a color conversion process on the bitmap data. In the first embodiment, the color conversion unit 220 converts R, G, and B gradation values for each print pixel to gradation values for a plurality of ink colors (gradation values for cyan (C), magenta (M), yellow (Y), and black (K) in this example). This type of color conversion between different color spaces is called color space conversion. The CMYK gradation values respectively represent a quantity of ink for each of the CMYK colors. Correspondences between RGB and CMYK colors are predetermined by a color conversion profile (not shown).

In S130 the halftone process unit 230 (see FIG. 1) performs a halftone process on each of the ink colors using the image data generated by the color conversion unit 220 (i.e., bitmap data expressing CMYK gradation values). In the halftone process, the halftone process unit 230 sets the dot size for each ink color of each print pixel. In the first embodiment, the halftone process unit 230 sets the dot size to one of four sizes: no dot (dN), small dot (dS), medium dot (dM), and large dot (dL). The quantity of ink used for dot formation is 0 for no dot and increases in steps as the dot size grows larger. The halftone process according to the first embodiment is implemented using an error diffusion method. However, the halftone process may be implemented according to any of a variety of methods known in the art, such as a method employing dither matrices.

In S140 the first data generation unit 241 (see FIG. 1) generates print data expressing the dot sizes set by the halftone process unit 230. Print data is data representing results of the halftone process in a format that can be interpreted by the printing unit 300 (and specifically the drive circuit 310). The print data determines correlations between each print pixel, the pass processes performed to form dots in each print pixel, and the nozzles Nz used to form the dots in each print pixel; the moving direction of the print head 320 in each pass process; and the conveying distance of each conveying process performed between pass processes. In S150 the data transmission unit 250 (see FIG. 1) transmits this print data to the printing unit 300. In S160, the CPU 110 controls the drive circuit 310 of the printing unit 300 to print the target image based on the print data received from the data transmission unit 250. These steps complete the process in FIG. 4.

FIG. 5A is an explanatory diagram showing a basic pattern for the relative positions in the first direction D1 of the print head 320 during different pass processes, and conveying distances used in the conveying processes. Hereinafter, a pattern describing the relative positions of the print head 320 in the first direction D1 for pass processes and the conveying distances used in conveying processes will be called a "conveyance pattern." FIG. 5A shows a sample printing operation performed with the cyan head unit 12C. The left side of FIG. 5A indicates the position of the cyan head unit 12C relative to the first direction D1 for each pass process. The reference number "P#" (where # is a number) assigned to each cyan head unit 12C represents the number of the pass process. For example, the reference number "P2" indicates the second pass process. Thus, the cyan head unit 12C having reference number P2 shows the position of the cyan head unit 12C in the first direction D1 during the second pass process. The expression "Fi=X" (where i and X are numbers) included next to arrows linking two consecutive pass processes indicates a conveying distance X (in units of dots) for a conveying process performed between an $i^{th}$ pass process and an $(i+1)^{th}$ pass process. For example, the expression "F2=4" indicates that the printing medium PM is conveyed four dots in a conveying process performed between a second pass process P2 and a third pass process P3. The numbers noted on the far left side of FIG. 5A underneath "LN" denote the order with respect to the first direction D1 of lines extending in the second direction D2 (hereinafter referred to as line numbers LN). In this description, it is assumed that the printed region begins from the first line (LN=1) and continues in the first direction D1. The right side of FIG. 5A shows dots dt formed on lines corresponding to the line numbers LN. A single dot dt corresponds to a single print pixel. Thus, a plurality of print pixels is arranged in a grid configured along the first direction D1 and second direction D2.

Nozzle numbers are also noted inside each cyan head unit 12C to indicate the positions of thirteen nozzles. In the example of FIG. 5, the first pitch K1 is set to "3" dots. Nozzles enclosed in a circle indicate nozzles used for printing, while those without a circle indicate nozzles not used for printing. For example, in the first pass process P1, the first and second nozzles are not used; in the second pass process P2, the first and thirteenth nozzles are not used; and in the third pass process P3, the twelfth and thirteenth nozzles are not used.

In the example of FIG. 5A, dots are formed in a continuous partial region A1 through the three pass processes P1-P3. That is, the conveying distances F1 and F2 performed in conveying processes interlaced between the three pass processes P1-P3 is constant at 4 dots. The conveying distances F1 and F2 (4 dots each) are relatively prime with the first pitch K1 (3 dots) of the cyan head unit 12C. Hence, the cyan head unit 12C can form dots dt in different lines during the pass processes P1-P3.

Further, the number of pass processes performed in this partial region (3) is identical to the first pitch K1 (3). Thus, by performing the pass processes P1-P3, the cyan head unit 12C can form dots dt in all lines within the continuous partial region A1. In the example of FIG. 5A, dots dt can be formed in the continuous partial region A1 constituting 33 lines from line 1 to line 33. Hereinafter this region will be referred to as the "first unit region A1."

In the example of FIG. 5A, nozzles positioned outside the first unit region A1 are not used for printing during the pass processes P1-P3. Specifically, in each pass processes, nozzles facing a region outside the unit region A1 are not used and remaining nozzles facing the unit region A1 are used for printing. Accordingly, dots can only be formed in the first unit region A1 during the three pass processes P1-P3. Further, the combination of nozzles not used during a pass process is different for each of the three passes. In other words, the combination of nozzles used for printing in a pass differs for each of the three passes.

After the third pass process P3, a conveying process is performed using a large conveying distance F3 (25 dots). Following this conveying process, three pass processes P4-P6 are formed in the same way as the pass processes P1-P3 described above. Through these pass processes, dots dt can be formed in all lines of a continuous partial region A2 configured of 33 lines from the 34th line to the 66th line (hereinafter referred to as a "second unit region A2"). The conveying distance F3 described above is set so as not to produce a gap between the first unit region A1 and second unit region A2.

Thereafter, the above process is repeated by alternately (1) forming dots in a continuous partial region through three pass processes while inserting a conveying process of a regular conveying distance (hereinafter called a "first conveying process") between consecutive pass processes, and (2) performing a conveying process of a large conveying distance (hereinafter called a "second conveying process") for shifting to the next continuous partial region. In this way, partial regions are printed one dot at a time in the first direction D1. Hereinafter, a continuous partial region in which dots dt can be formed through three pass processes will be called a "unit region." Further, the process for printing one unit region will be called a "unit print."

As described above, the conveying distance (4 dots) of the first conveying processes interlaced with the three pass processes for a unit region is greater than 1 dot, thereby mitigating the effects of defective nozzles on printing quality. As an example, dots dt formed in the first unit region A1 by the sixth nozzle have been shaded in FIG. 5A. Specifically, the sixth nozzle forms dots dt in three lines: the tenth, fourteenth, and eighteenth lines. If the sixth nozzle were defective, e.g., if the nozzle were clogged or were to eject ink droplets in an abnormal direction, white streaks with no dots dt, dot position deviations, or other dot formation problems could occur in the three consecutive lines described above. However, as shown in the example of FIG. 5A, the lines in which these abnormalities occur would be separated from each other a distance equivalent to the conveying distance, which is larger than 1.

Next, a conventional conveyance pattern will be described for reference. FIG. 6 is an explanatory diagram showing a conveyance pattern in which the conveying distance in the conveying process performed between consecutive pass processes is "1". The sample conveyance pattern in FIG. 6 is similar to that in FIG. 5A. However, in this case the sixth nozzle is used to form three consecutive lines of dots dt: the sixteenth, seventeenth, and eighteenth lines. If the sixth nozzle were to become defective, the printing abnormalities due to this nozzle would be included within a strip-like region configured of three consecutive lines in the first direction D1.

When comparing FIG. 5A to FIG. 6, it is apparent that the printing abnormalities in FIG. 6 are more noticeable because the abnormalities appear in a plurality of consecutive lines. In contrast, since the lines with abnormalities in the example of FIG. 5A are interspersed between lines having no abnormalities, the abnormal lines are less noticeable. This effect is the same when nozzles other than the sixth nozzle become defective.

While the above description focuses on the cyan head unit 12C, the yellow head unit 12Y and magenta head unit 12M form dots dt on the same lines during the same pass processes.

Figure 7:
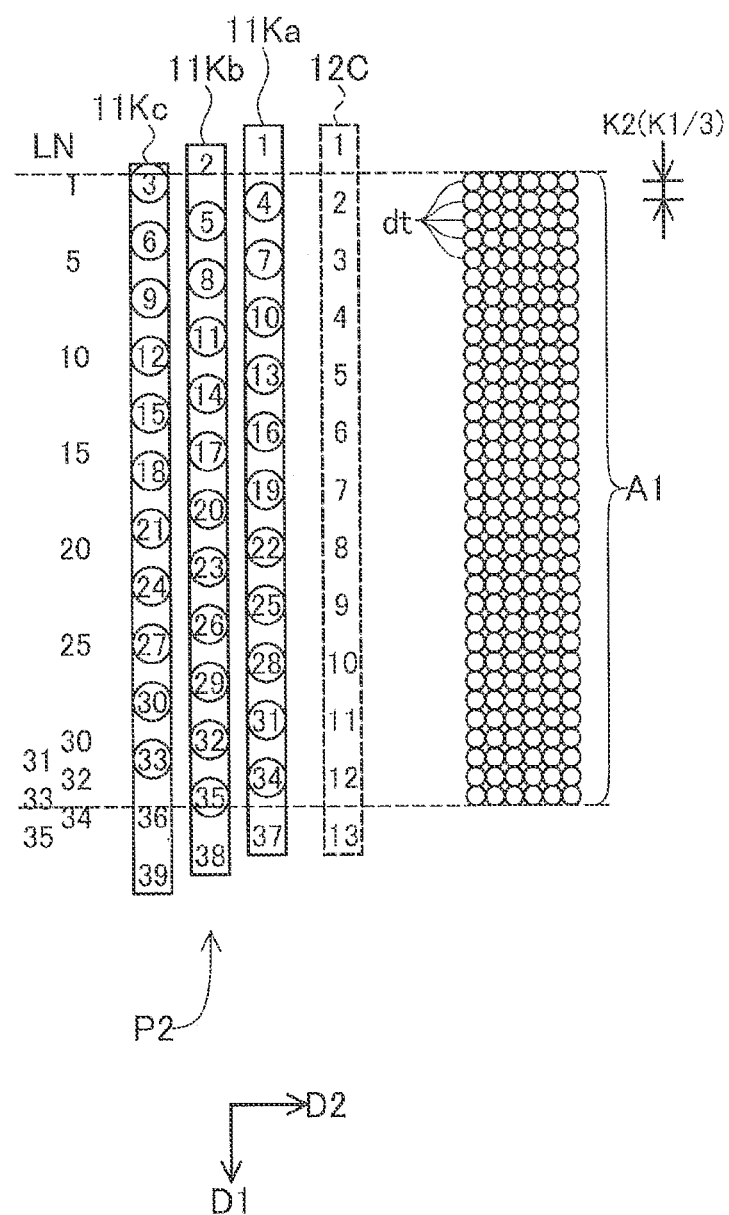
FIG. 7 is an explanatory diagram for dot formation in black ink.

FIG. 7 is an explanatory diagram for dot for nation in black ink. As described above, the formation of ink dots in the colors cyan, magenta, and yellow is distributed over three pass processes for a single unit region. The formation of black ink dots within a single unit region, on the other hand, is achieved in just one of the three pass processes. In the example of the first embodiment shown in FIG. 7, black ink dots are formed in the first unit region A1 during the second pass process P2. As indicated in the drawing, nozzles positioned outside the first unit region A1 are not used for printing. Specifically, the first, second, and 36th through 39th nozzles are not used when forming black dots in the first unit region A1. As described with reference to FIG. 3, the second pitch K2 of black nozzles Nz is equal to the distance between dots in the first direction D1 (i.e., the printing resolution). Accordingly, black dots dt can be formed for all lines in the first unit region A1 during one pass process. As in the example of FIG. 7, black dots dt are formed during the second of the three pass processes for other unit regions, as well.

Note that black dots dt may be formed during the first or third of the three pass processes instead for any unit region. As in the example of the cyan head unit 12C, the formation of black dots dt in a single unit region may instead be distributed over three pass processes using only the first black head unit 11Ka. Alternatively, all nozzles Nz in the black head units 11Ka, 11Kb, and 11Kc may be used to perform a printing operation when the operation requires only black ink.

Figure 8:
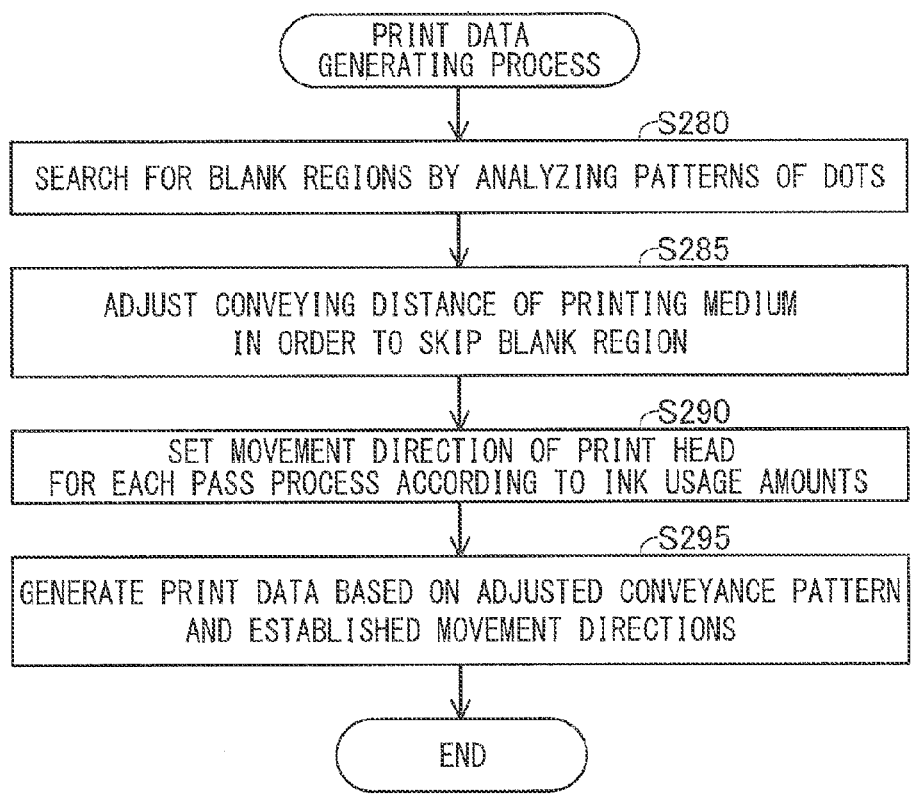
FIG. 8 is a flowchart illustrating steps in the print data generating process in S140 of FIG. 4.

FIG. 8 is a flowchart illustrating steps in the print data generating process (S140 of FIG. 4). The first data generation unit 241 sets correlations among print pixels, pass processes, and nozzles based on the conveyance pattern described above and generates print data according to these correlations. In the first embodiment, the first data generation unit 241 also performs a process to skip blank regions (S285) and a process to set the movement directions of the print head 320 based on ink usage amounts (S290), as is described below in detail.

In S280 at the beginning of the print data generating process, the first data generation unit 241 searches for blank regions by analyzing the patterns of dots set in S130 of FIG. 4. A blank region is a continuous region configured of lines adjacent in the second direction D2 for which dots are not formed. Any line in which at least one dot is formed, regardless of ink color, is not considered a blank region. FIG. 5B is an explanatory diagram showing an example of a printing operation for a region that includes a blank region Ab. FIG. 5B shows an example of a conveyance pattern similar to that in FIG. 5A. In the example of FIG. 5B, the continuous region constituting 30 lines from the 50th to 79th line is considered a blank region Ab. As shown in the drawing, the blank region Ab begins in the middle of the second unit region A2.

In S285 of FIG. 8, the first data generation unit 241 adjusts the conveying distance of the printing medium PM in order to skip the blank region Ab. Since the blank region Ab continues downstream in the first direction D1 from the second unit region A2 in the example of FIG. 5B, the first data generation unit 241 adjusts the conveying distance F6 between the second unit region A2 and third unit region A3 so that printing in the next unit region (the third unit region A3) continues on the downstream side of the blank region Ab in the first direction D1. That is, the first data generation unit 241 sets the conveying distance F6 such that the third unit region A3 begins on the 80th line following the last line of the blank region Ab in the first direction D1 (the 79th line). Thus, the conveying distance F6 is changed from the usual 25 dots to 38 dots. Since printing is performed by unit regions in the first embodiment, skipping blank regions Ab as described above can greatly reduce the time required for printing.

FIGS. 9A and 9B are explanatory diagrams showing another conveyance pattern. The conveyance pattern in FIG. 9 illustrates the effects of skipping a blank region Ab described in FIG. 5B. FIG. 9A shows a basic conveyance pattern similar to that in FIG. 5A, and FIG. 9B shows a conveyance pattern similar to that in FIG. 5B when printing a region that includes a blank region Ab. First, the basic conveyance pattern will be described with reference to FIG. 9A, followed by a description of the conveyance pattern for skipping the blank region Ab.

In the example of FIG. 9, all nozzles of the cyan head unit 12C are used in all pass processes. The conveying process performed between consecutive pass processes has a uniform conveying distance of 13 in this example and will be referred to as the "regular conveying process." Thus, the printing unit 300 repeatedly and alternately performs a pass process using all nozzles and a regular conveying process. In this example, dots dt can be formed in all lines beginning from the position of the ninth nozzle in the first pass process P1 and continuing downstream in the first direction D1. Therefore, the line formed by dots dt using the ninth nozzle in the first pass process P1 will be treated as the first line. As with the cyan head unit 12C in this example, the head units 12M, 12Y, and 11Ka can form dots in their respective colors magenta, yellow, and black beginning from the same line as the cyan head unit 12C. As in the example of FIG. 7 for black, all three black head units 11Ka, 11Kb, and 11Kc may be used in a single pass process to form dots in a plurality of lines arranged at intervals equivalent to the printing resolution.

In FIG. 9A, dots dt formed by the sixth nozzle have been shaded. In this example, the sixth nozzle forms dots dt in the fifth, eighteenth, and thirty-first lines. Thus, lines associated with the sixth nozzle are separated from each other. As in the example of FIG. 5A, this arrangement can prevent printing problems from becoming noticeable if the sixth nozzle becomes defective, for example.

FIG. 9B shows an example of a conveyance pattern for skipping a blank region Ab. As in the example of FIG. 5B, the blank region Ab begins from the 50th line. Printing up to the 49th line, one line prior to the blank region Ab, is completed in the sixth pass process P6. When skipping a blank region Ab, the first data generation unit 241 adjusts the conveying distance F6 for the conveying process performed between the sixth pass process P6 and the seventh pass process P7. As described with reference to FIG. 9A, printing for a new pass process can begin from the position of the ninth nozzle and proceed in the first direction D1. Hence, the first data generation unit 241 sets the conveying distance F6 such that the ninth nozzle in the seventh pass process P7 is positioned on the 80th line, i.e., the line following the last line (79th line) of the blank region Ab in the first direction D1. In this case, the first data generation unit 241 changes the conveying distance F6 from its normal 13 dots to 14 dots.

According to the conveyance pattern of FIGS. 9A and 9B, the printing unit 300 prints at uniform conveying distances using all nozzles rather than by unit regions. Hence, this pattern has limitations in the amount the conveying distance can be increased when skipping a blank region Ab. In contrast, the example in FIG. 5B can greatly increase the conveying distance. Thus, by skipping blank regions Ab, the conveyance pattern according to the preferred embodiment greatly reduces the time required for printing in comparison to the conveyance pattern of FIG. 9.

As described above, the first data generation unit 241 sets the final conveyance pattern by adjusting conveying distances to skip blank regions Ab. The first data generation unit 241 arranges a plurality of unit regions over the target image according to this final conveyance pattern (and more specifically, according to the conveying distances).

Returning to FIG. 8, the first data generation unit 241 sets in S290 the movement direction of the print head 320 for each pass process according to ink usage amounts. That is, the first data generation unit 241 sets the direction of movement for each pass process to either the right direction DR or the left direction DL (FIG. 3).

Figure 10:
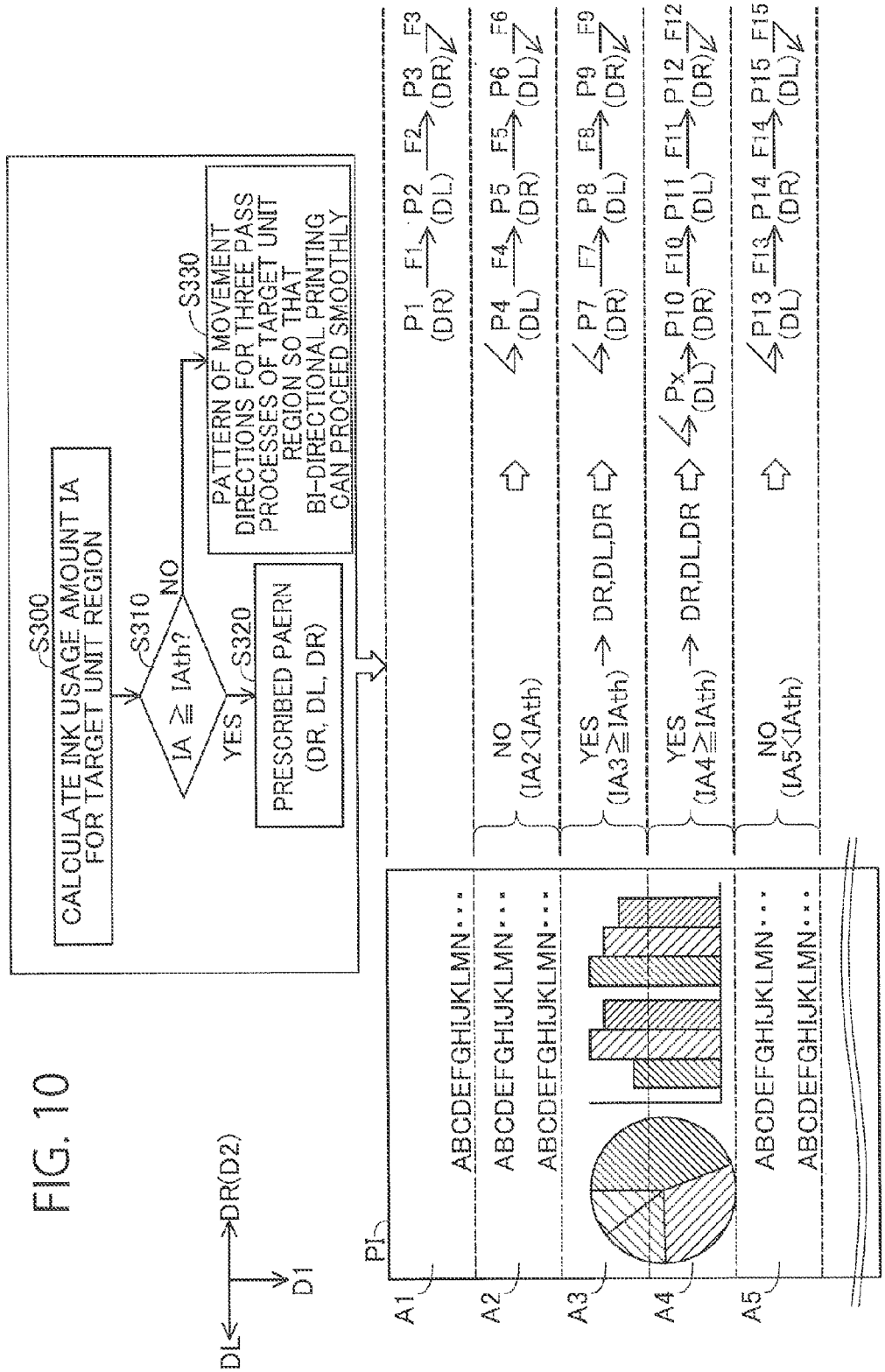
FIG. 10 is an explanatory diagram showing an example of setting a movement direction of the print head.

FIG. 10 is an explanatory diagram showing an example of setting the movement directions of the print head 320. The drawing includes a sample target image (hereinafter called a "target image PI"), a flowchart illustrating steps in a process for setting the movement directions, and a sample conveyance pattern based on the determined movement directions. A plurality of unit regions A1-A5 is indicated in the target image PI.

The first data generation unit 241 executes the process to set movement directions of the print head 320 for each unit region. Each unit region of the target image (hereinafter called a "target unit region") is selected in order of the first direction D1. As described above, a single unit region is printed with three pass processes. The first data generation unit 241 sets a pattern of movement directions for the three pass processes to either "right direction DR, left direction DL, right direction DR" or "left direction DL, right direction DR, left direction DL" in order to perform bi-directional printing.

In S300 at the beginning of the process in FIG. 10, the first data generation unit 241 calculates an ink usage amount IA for the target unit region by analyzing the pattern of dots set in S130 of FIG. 4. The ink usage amount IA can be calculated as the total number of dots for all ink colors used within the target unit region. If a plurality of dot sizes is employed in printing, the numbers of dots for each dot size may be weighted differently by size.

In S310 the first data generation unit 241 determines whether the ink usage amount IA exceeds a prescribed threshold IAth. Generally, differences in the appearance of colors caused by the different orders of superposing ink are not noticeable in light regions, that is, in regions with a low ink usage amount. Therefore, if the ink usage amount IA is less than the threshold IAth (S310: NO), in S330 the first data generation unit 241 sets the pattern of movement directions for the three pass processes of the target unit region so that bi-directional printing can proceed smoothly. More specifically, the first data generation unit 241 adopts the pattern whose first movement direction is the direction opposite the movement direction used in the last pass process for printing the preceding unit region.

For example, the first data generation unit 241 sets the movement directions for the three pass processes in the first unit region A1 to a prescribed pattern (the pattern "DR, DL, DR" in the example of FIG. 10). The ink usage amount IA is less than the threshold IAth for the second unit region A2. Here, the last pass process for printing the preceding first unit region A1 is the third pass process P3, and the movement direction for the third pass process P3 is the right direction DR. Therefore, the pattern beginning from the left direction DL, which is the opposite direction to the movement direction for the third pass process P3 (the right direction DR), i.e., the pattern "DL, DR, DL," is used as the pattern of movement directions for the three pass processes P4-P6 when printing the second unit region A2.

When the ink usage amount IA exceeds the threshold IAth (S310: YES), in S320 the first data generation unit 241 sets the pattern of movement directions for the three pass processes used to print the target region to a prescribed pattern. In the first embodiment, the pattern "DR, DL, DR" is used when the ink usage amount IA is large. In the example of FIG. 10, the ink usage amount IA exceeds the threshold IAth in the third unit region A3. Hence, the pattern of movement directions for the three pass processes P7, P8, and P9 in the third unit region A3 is set to the pattern "DR, DL, DR." Since the movement direction for the last pass process in the preceding second unit region A2 the sixth pass process P6) is the left direction DL in the example of FIG. 10, the three pass processes P7, P8, and P9 for the third unit region A3 can proceed smoothly from the three pass processes P4, P5, and P6 for the second unit region A2.

In the example of FIG. 10, the ink usage amount IA also exceeds the threshold IAth for the following fourth unit region A4. Therefore, the first data generation unit 241 sets the pattern of movement directions for the three pass processes P10, P11, and P12 used in printing the fourth unit region A4 to the pattern "DR, DL, DR." In this case, the movement direction of the last pass process in the preceding third unit region A3 (the pass process P9) is the right direction DR, which is identical to the movement direction of the first pass process in the fourth unit region A4 (the tenth pass process P10). Thus, the first data generation unit 241 inserts a process Px between the ninth pass process P9 and the tenth pass process P10 to move the print head 320 in the left direction DL without forming ink dots. By adding this step, the pass processes P10, P11, and P12 for the fourth unit region A4 can proceed smoothly from the pass processes P7, P8, and P9 for the third unit region A1

In the example of FIG. 10, the ink usage amount IA is less than the threshold IAth for the fifth unit region A5. Therefore, the first data generation unit 241 sets the pattern of movement directions in the three pass processes for the fifth unit region A5 to "DL, DR, DL" to continue in alternating directions from the preceding fourth unit region A4.

When viewing the printed image, the user can perceive the regions formed by pluralities of lines as an overall single region. When the regions observed by the user are expressed by a plurality of lines formed by superposing ink colors in different orders, the user perceives the overall color expressed by the plurality of lines as the color of that region. As described above, the third unit region A3 and the fourth unit region A4 are printed using the same movement pattern ("DR, DL, DR"). Hence, lines having ink colors superposed in the order MCY (lines formed in the right direction DR) and lines having ink colors superposed in the order YCM (lines formed in the left direction DL) have the same arrangement and proportion (specifically, 2:1) for each of the third unit region A3 and fourth unit region A4. Thus, like colors among the third unit region A3 and fourth unit region A4 are less likely to appear different from each other.

If the fourth unit region A4 were printed using the movement pattern "DL, DR, DL" instead, the arrangement and proportion of the two types of lines would be different between the third unit region A3 and fourth unit region A4. Consequently, like colors in the third unit region A3 and fourth unit region A4 would have a possibility of appearing different from each other. The method of the first embodiment reduces the possibility of like colors appearing different from each other between the two unit regions A3 and A4.

While the above description considers the superposing order of the three color inks C, M, and Y, the same description is applicable to the superposing order of the four ink colors C, M, Y, and K that include black. That is, since the arrangement and proportion of a plurality of types of lines, each of which has a different order of superposition, is identical between the unit regions A3 and A4, the method of the first embodiment can reduce the possibility of like colors in the unit regions A3 and A4 appearing different from each other.

Once the movement direction for each pass process has been set as described above, in S295 of FIG. 8 the first data generation unit 241 generates print data based on the adjusted conveyance pattern and the established movement directions. Hereinafter, print data generated by the first data generation unit 241 will be called "drive control data."

In the first embodiment described above, the position of the print head 320 relative to the first direction D1 differs among the three pass processes used for printing a unit region (see FIG. 5) and, hence, the combination of nozzles also differs in each of the three pass processes (see FIG. 5A). Accordingly, unlike the example in FIG. 6 in which the combination of nozzles used for printing is the same for all three pass processes, the configuration of the embodiment can form dots dt in all lines of the unit region and can easily avoid a plurality of consecutive lines being printed by the same nozzle. As a result, the multifunction peripheral 100 of the first embodiment can perform printing processes by unit region while suppressing a drop in image quality caused by a nozzle becoming defective. Further, since the conveying distance implemented between the three pass processes for a unit region (four dots in this example) differs from the conveying distance implemented between unit regions (25 dots in this example), a process of printing the plurality of unit regions can advance appropriately one unit region at a time in the first direction D1. The printing of unit regions is simplified by not using nozzles positioned outside the unit region.

Further, the multifunction peripheral 100 adjusts the conveying distance between one unit print and the subsequent unit print in order to skip a blank region, as illustrated in FIG. 5B. Thus, the multifunction peripheral 100 can easily avoid an increase in the required printing time.

A uniform conveying distance is used in conveying processes performed between the three pass processes used to print a single unit region. This facilitates the execution of unit prints and provides a simple method of suppressing printing issues.

As illustrated in FIGS. 3 and 7, the total number of nozzles Nz used for black ink (39) is three times the total number of nozzles Nz used for cyan ink (13). Further, the second pitch K2 for black is one-third the first pitch K1 for cyan. In this way, the multifunction peripheral 100 can easily suppress the printing issues described above since the nozzles Nz used for cyan are arranged at a lower density than the nozzles Nz used for black. Further, black dots are formed in lines adjacent to each other in the first direction D1 at the second pitch K2 in only one of the three pass processes of a unit print using at least some of the 39 nozzles Nz, as illustrated in FIG. 7. In this way, printing issues can be suppressed by printing using a relatively high density of nozzles for black ink and a relatively low density of nozzles for cyan, magenta, and yellow ink.

As illustrated in FIG. 10, the multifunction peripheral 100 can suppress printing problems caused by the order in which the CMYK ink colors are superimposed by setting the movement direction of the print head 320 for each of the three pass processes of a unit print based on the ink usage amount in the unit print. In particular, when the ink usage amount IA in the unit region exceeds the threshold IAth in the example of FIG. 10, the first data generation unit 241 sets the pattern of movement directions for the three pass processes to a prescribed pattern, and specifically the pattern "DR, DL, DR." In this way, the multifunction peripheral 100 can prevent colors that are intended to be the same from appearing different from each other between different unit regions.

B. Second Embodiment

FIGS. 11A and 11B are explanatory diagrams showing a conveyance pattern applied by the first data generation unit 241 according to a second embodiment. FIG. 11A shows a basic conveyance pattern similar to that in FIG. 5A, and FIG. 11B shows a conveyance pattern similar to that in FIG. 5B used for skipping a blank region Ab. The hardware configuration of the multifunction peripheral used in the second embodiment is identical to that of the multifunction peripheral 100 shown in FIG. 1. In addition to the functional units of the CPU 110 described in the first embodiment, the CPU 110 also functions as a defective nozzle identification unit 270. Further, the printing process performed in the second embodiment is generally the same as the process described in the first embodiment with reference to FIG. 4.

In the conveyance pattern of FIG. 11A, fewer nozzles are used for performing one pass process than in the conveyance pattern of FIG. 5 (9 nozzles in FIG. 11A). During the three pass processes for a single unit print, the first through fourth nozzles Nz are not used in the first pass process, the first, second, twelfth, and thirteenth nozzles Nz are not used in the second pass process, and the tenth through thirteenth nozzles Nz are not used in the third pass process. Further, the conveying distance used between consecutive pass processes for a single unit print (the conveying distance F1, for example) is 7 dots in the second embodiment. A single unit region is configured of 27 lines, and the conveying distance for a conveying process performed between unit prints (the conveying distance F3, for example) is 13 dots. Since the number of nozzles used for a single pass process according to the conveyance pattern in FIG. 11A is smaller than the number of nozzles used according to the conveyance pattern of FIG. 5A, more time is required for printing. The magenta head unit 12M and yellow head unit 12Y for printing the other color inks magenta and yellow form dots in the same way as the cyan head unit 12C. However, black dots are formed at the printing resolution through a single pass, as described in FIGS. 5 and 7.

In FIG. 11A, dots dt within the first unit region A1 that are formed by the sixth nozzle have been shaded. In the example of FIG. 11A, the sixth nozzle forms dots dt in the fourth, eleventh, and eighteenth lines. Hence, the lines in which a single nozzle can form dots dt are separated from each other, thereby mitigating the effects that nozzle defects can have on image quality.

FIG. 11B shows a blank region Ab configured of 30 consecutive lines from the fiftieth to the seventy-ninth line, as in the example of FIG. 5B. This blank region Ab begins in the middle of the second unit region A2. The first data generation unit 241 modifies the conveying distance F6 of the conveying process performed between the unit print for the second unit region A2 and the unit print for the third unit region A3 from the normal 13 to 38 dots. Since the printing unit 300 can perform printing by unit regions in the second embodiment, this method can greatly reduce the amount of time required for printing by skipping blank regions Ab.

Figure 12:
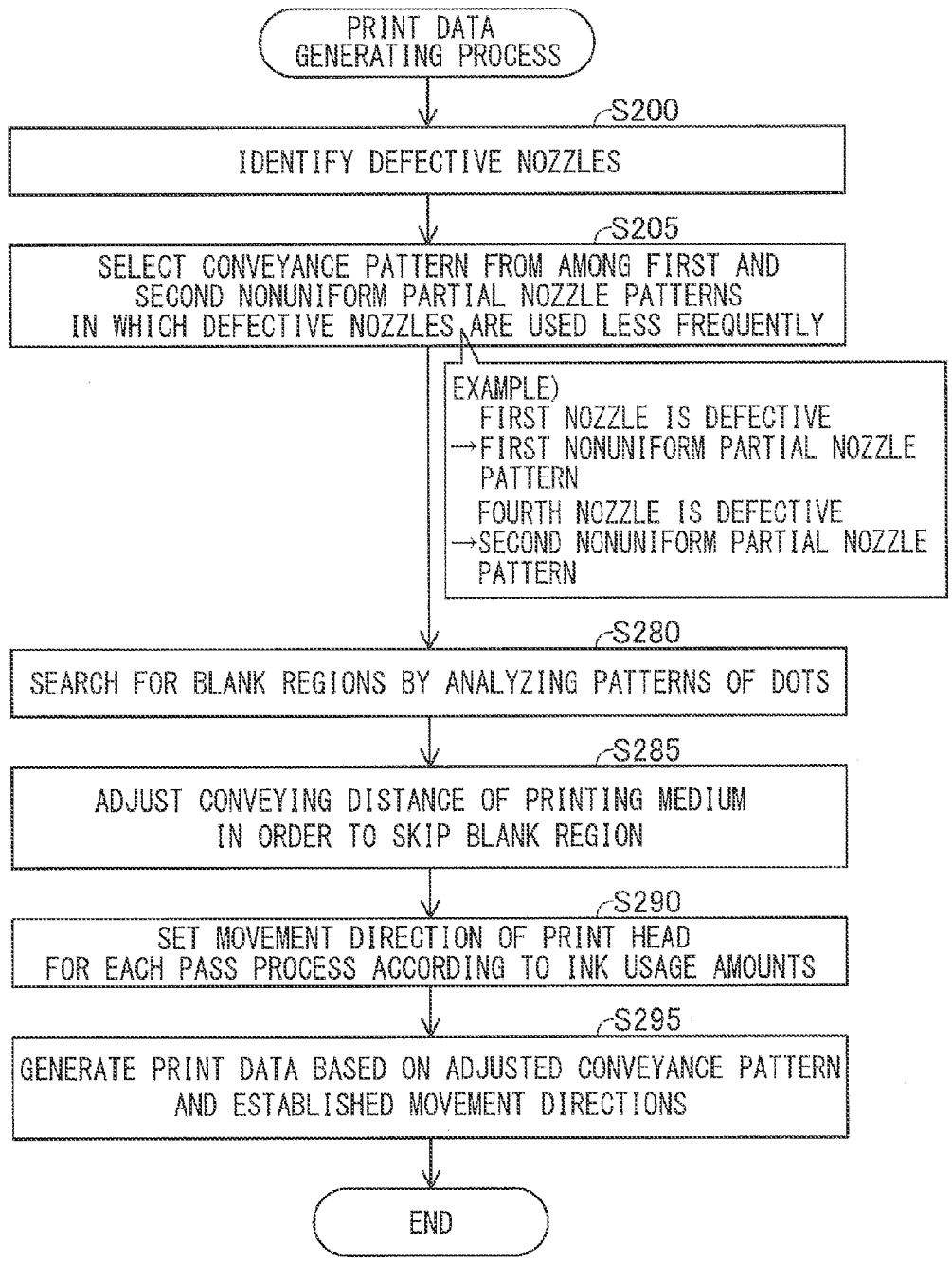
FIG. 12 is a flowchart illustrating steps in a print data generating process in S140 of FIG. 4 according to the second embodiment.

FIG. 12 is a flowchart illustrating steps in the print data generating process (S140 of FIG. 4) according to the second embodiment. In the second embodiment, the first data generation unit 241 selects a conveyance pattern according to the position of a defective nozzle(s). The conveyance pattern may be selected from among the pattern in FIGS. 5A and 5B (hereinafter referred to as the "first nonuniform partial nozzle pattern") and the pattern in FIGS. 11A and 11B (hereinafter referred to as the "second nonuniform partial nozzle pattern").

In S200 at the beginning of the print data generation process, the first data generation unit 241 identifies defective nozzles. In the second embodiment, data identifying defective nozzles (hereinafter called "defective nozzle data") is stored in the volatile storage device 120 or nonvolatile storage device 130 in advance, and the first data generation unit 241 identifies defective nozzles by referencing the defective nozzle data.

The defective nozzle identification unit 270 (see FIG. 1) creates the defective nozzle data in the second embodiment. The defective nozzle identification unit 270 creates defective nozzle data by receiving information specifying defective nozzles from the user. The user identifies defective nozzles by inspecting the printing results of a test pattern and inputs data identifying the defective nozzles through operations on the operating unit 160. The test pattern is configured of patches printed with each nozzle, for example. The print data generation unit 200 generates print data representing the test pattern in response to a user command. The data transmission unit 250 transmits the print data generated by the print data generation unit 200 to the printing unit 300, and the printing unit 300 prints the test pattern based on the print data received from the data transmission unit 250.

The defective nozzle identification unit 270 may also be configured to identify defective nozzles automatically. For example, the multifunction peripheral 100 may possess a scanner for optically reading the printed test pattern. In this case, the defective nozzle identification unit 270 can analyze the image data generated by the scanner to identify defective nozzles and can create defective nozzle data based on the identification results.

In S205 of FIG. 12, the first data generation unit 241 selects the conveyance pattern from among the first and second nonuniform partial nozzle patterns (FIG. 5 and FIG. 11) in which defective nozzles are used less frequently. If the frequency in which defective nozzles are used is the same between the first and second nonunifolm partial nozzle patterns, the first data generation unit 241 selects the first nonuniform partial nozzle pattern since this pattern requires a relatively shorter print time (i.e., uses a greater number of nozzles in a single pass process).

With the conveyance pattern of FIG. 5A, for example, the first nozzle is used in only one of the three pass processes for a single unit print and thus has a usage rate of 1/3. With the conveyance pattern of FIG. 11A, the first nozzle is also used in only one of the three pass processes and thus has a usage rate of 1/3. Therefore, if the first nozzle becomes defective, the first data generation unit 241 selects the first nonuniform partial nozzle pattern because the usage rate of the defective nozzle is the same for both conveyance patterns.

With the conveyance pattern of FIG. 5A, the fourth nozzle is used in all three pass processes for a unit print and thus has a usage rate of 3/3. In the conveyance pattern of FIG. 11A, on the other hand, the fourth nozzle is used in only two of the three pass processes and thus has a usage rate of 2/3. Hence, if the fourth nozzle becomes defective, the first data generation unit 241 selects the second nonuniform partial nozzle pattern in which the defective nozzle is used less frequently.

While the above description covers a defective nozzle in the cyan head unit 12C, usage rates are similarly calculated for defective nozzles in the other head units used in printing. Thereafter, the first data generation unit 241 selects the conveyance pattern having the smallest value of total usage rate for all defective nozzles in head units used in printing. Note that the extent to which a defective nozzle affects printing quality depends on the ink color. Therefore, the first data generation unit 241 may select a conveyance pattern based on defective nozzles for some of the ink colors having the greatest effect on image quality. For example, the first data generation unit 241 may select a conveyance pattern based on defective nozzles for all ink colors other than yellow.

Subsequent steps S280, S285, S290, and S295 in FIG. 12 are identical to the steps with the same numbers in FIG. 8. In this way, the first data generation unit 241 generates print data based on the conveyance pattern selected in S205.

In the second embodiment described above, the first data generation unit 241 generates print data based on the conveyance pattern that uses defective nozzles with the least frequency. In other words, the first data generation unit 241 generates print data in which at least one of the three pass processes for a unit print can be performed without using at least some of the defective nozzles, thereby mitigating the effects of defective nozzles on printing quality.

C. Third Embodiment

Figure 13:
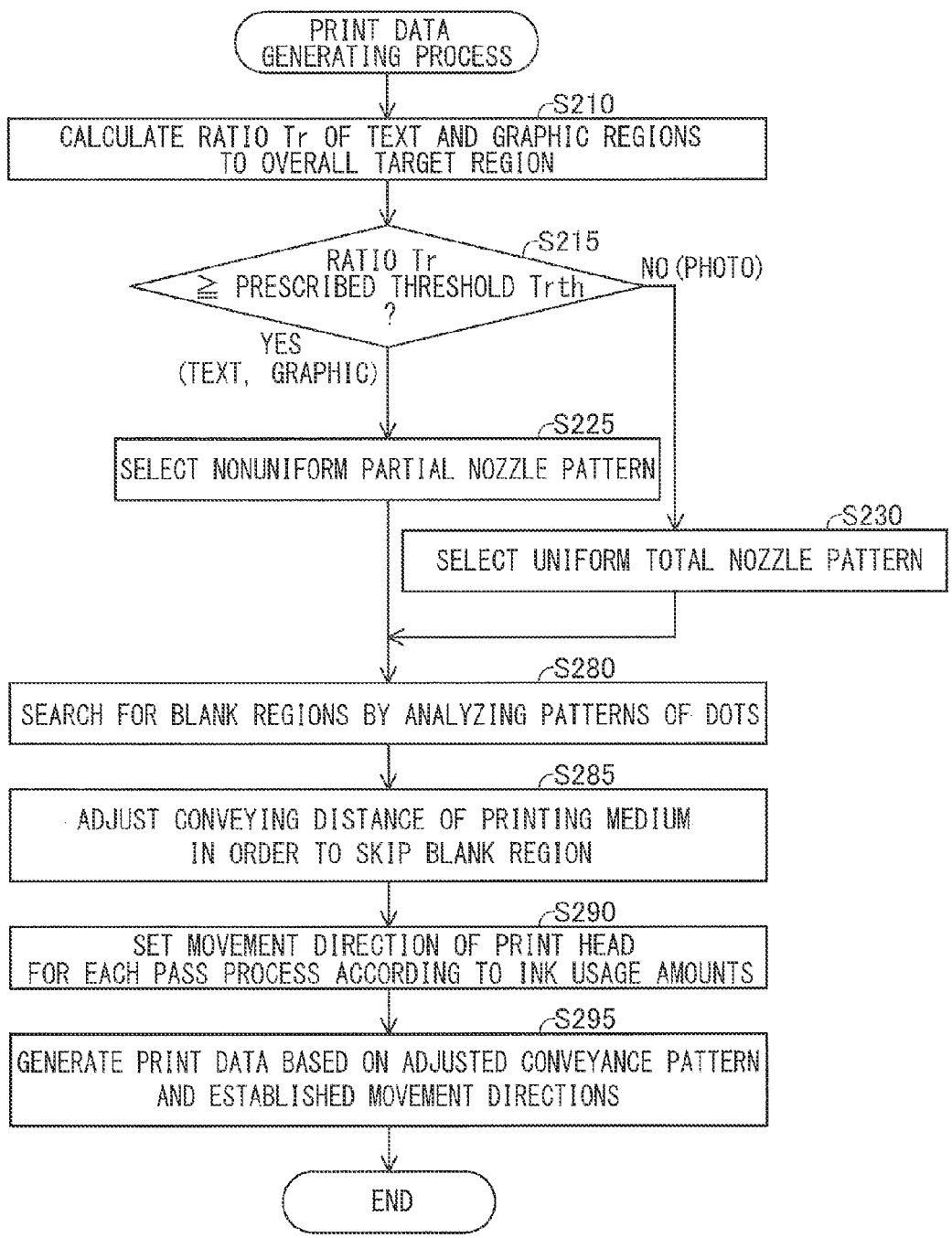
FIG. 13 is a flowchart illustrating steps in a print data generating process in S140 of FIG. 4 according to a third embodiment.

FIG. 13 is a flowchart illustrating steps in a print data generating process according to a third embodiment. In the third embodiment, the first data generation unit 241 selects a conveyance pattern based on the type of image. The hardware structure of the multifunction peripheral used in the third embodiment is identical to that of the multifunction peripheral 100 shown in FIG. 1. In addition to the functional units of the CPU 110 described in the first embodiment, the CPU 110 also functions as a second data generation unit 242 and a selection unit 249 (FIG. 1). The overall printing process in the third embodiment is identical to that described in the first embodiment with reference to FIG. 4.

In S210 at the beginning of the print data generating process of FIG. 13, the selection unit 249 (see FIG. 1) analyzes the target image to calculate a ratio Tr of text and graphics regions to the overall target region. Specifically, the selection unit 249 analyzes the input image data to detect, from the target image, text regions that represent text, photo regions that represent photographs, and graphics regions that represent graphics. Graphics regions account for any images other than text and photographs, such as illustrations, tables, histograms, pie charts and other graphs, diagrams, patterns, and the like. Next, the selection unit 249 calculates the ratio Tr as the surface area ratio of text regions and graphics regions to the overall surface area of the image. Here, the selection unit 249 may also use other types of image data representing the target image instead of the input image data (for example, bitmap data generated by the rasterizer 210).

Various well-known methods may be used to detect regions in the target image constituting different types of objects. One such method involves dividing the target image into a plurality of process regions, calculating the distribution of pixel values (values representing brightness, for example) for each process region, classifying process regions having a distribution smaller than a first threshold as text regions, classifying process regions having a distribution larger than a second threshold (where second threshold>first threshold) as photo regions, and classifying process regions having a distribution greater than or equal to the first threshold and less than or equal to the second threshold as graphics regions. The selection unit 249 may also detect regions of a plurality of types using data other than the distribution of pixel values, such as the number of colors in each process region, or based on a combination of a plurality of types of data.

In S215 the selection unit 249 determines whether the ratio Tr exceeds a prescribed threshold Trth. When the ratio Tr exceeds the prescribed threshold Trth (S215: YES), i.e., when the ratio of text regions or graphics regions is high, in S255 the selection unit 249 selects the first nonuniform partial nozzle pattern (i.e., the first data generation unit 241). As in the example of FIG. 8, the selected first data generation unit 241 executes the subsequent steps S280, S285, S290, and S295 to generate print data. Note that the first data generation unit 241 generates print data according to the first nonuniform partial nozzle pattern (see FIG. 5). However, the first data generation unit 241 may employ the second nonuniform partial nozzle pattern (see FIG. 11) instead or may select a conveyance pattern according to the procedure described with reference to FIG. 12.

There is a higher probability that graphics regions will include regions of uniform color (also called "solid regions") than other types of regions. For example, graphics regions may include the solid regions of pie charts or illustrations. Colors are more likely to appear different in such solid regions when the superposing order of ink is different. Therefore, if the target image has a high ratio of graphics regions in the third embodiment (S215: YES), the first data generation unit 241 selects a nonuniform partial nozzle pattern (see FIGS. 5 and 11) to use when executing S290 of FIG. 13, thereby suppressing a noticeable difference in the appearance of colors caused by a different order in superposing ink.

Further, when the target image has a high ratio of text regions or graphics regions, there is a high probability that the target region includes blank regions (such as the blank region Ab shown hi FIG. 5B). In the third embodiment, the first data generation unit 241 executes steps S280 and S285 of FIG. 13 based on a nonuniform partial nozzle pattern in order to ensure a shorter printing time by skipping the blank regions. Further, as described with reference to FIGS. 5A and 11A, use of a nonuniform partial nozzle pattern mitigates the effects that defective nozzles have on image quality.

When the ratio Tr is less than the prescribed threshold Trth (S215: NO), i.e., when the target image has a high ratio of photo regions, in S230 the selection unit 249 selects a uniform total nozzle pattern shown in FIGS. 9A and 9B. In the third embodiment, the second data generation unit 242 (see FIG. 1) generates print data based on the uniform total nozzle pattern. The second data generation unit 242 executes the subsequent steps S280, S285, S290, and S295 based on the uniform total nozzle pattern to generate print data.

Step S280 performed by the second data generation unit 242 is identical to step S280 executed by the first data generation unit 241. The second data generation unit 242 executes the step S285 as described with reference to FIG. 9B. While skipping blank regions using the uniform total nozzle pattern has less effect on reducing printing time than when the nonuniform partial nozzle pattern is used, it is less likely that photo regions will include blank regions. Accordingly, generating print data based on the uniform total nozzle pattern is not problematic in this case. On the other hand, the uniform total nozzle pattern uses all nozzles in all pass processes. Accordingly, the use of more nozzles than with the nonuniform partial nozzle pattern helps to suppress an increase in the printing time.

S290 may be omitted when executed by the second data generation unit 242 because photo regions are less likely to include uniform color regions (solid regions, for example) than graphics regions. Therefore, differences in color appearance caused by different orders of superposing ink is less noticeable in photo regions and, hence, a drop in image quality is unlikely to be noticed even when S290 has been omitted, In this case, the second data generation unit 242 simply sets the movement directions of the print head 320 to repeatedly alternate between the right direction DR and left direction DL for each successive pass process.

As in the example of FIG. 10, the second data generation unit 242 may set the movement direction of each pass process based on the ink usage amount. For example, the second data generation unit 242 may set the movement direction of a pass process to a prescribed direction (the right direction DR, for example) when the pass process prints a line whose ink usage amount exceeds the prescribed threshold. The second data generation unit 242 may set the movement directions for partial regions configured of a plurality of consecutive lines.

In S295 the second data generation unit 242 generates print data based on the conveyance pattern and the movement direction for each pass process. Hereinafter, print data generated by the second data generation unit 242 will be called the "drive control data."

In the third embodiment described above, the selection unit 249 selects one of the first data generation unit 241 and second data generation unit 242 for generating print data based on the type of object represented by the target image (the percentage of surface area in the target image occupied by text regions and graphics regions combined). Thus, the printing unit 300 can execute a suitable printing process for the type of target image. For example, let's assume that a nonuniform partial nozzle pattern is better suited for printing a target image that primarily represents photographs. In this case, the target image is unlikely to include blank regions, and only some of the nozzles are used in each pass process. Consequently, it is more likely that the printing operation will require more time. Let's also assume that the uniform total nozzle pattern is suitable for printing a target image that primarily represents charts (histograms or pie charts, for example). In this case, it is highly likely that the target image will include regions of uniform colors (solid regions), and there is a high probability that differences in the appearance of colors caused by the different order of superposing ink colors will be noticeable in such solid regions. Further, even if the target image includes blank regions, the time reduction achieved by skipping these blank regions will not be as great as when using the nonuniform partial nozzle pattern. The method of the preferred embodiment can mitigate these printing issues.

D. Fourth Embodiment

FIG. 14 is an explanatory diagram showing a conveyance pattern that can be applied by the print data generation unit 200 according to a fourth embodiment. FIG. 14A shows a basic conveyance pattern similar to that in FIG. 5A, while FIG. 14B shows a conveyance pattern similar to that in FIG. 5B for skipping a blank region Ab. The hardware structure of the multifunction peripheral used in the fourth embodiment is identical to that of the multifunction peripheral 100 shown in FIG. 1. In addition to the functional units of the CPU 110 described in the first embodiment, the CPU 110 also functions as a third data generation unit 243, selection unit 249, and defective nozzle identification unit 270 (FIG. 1). The steps in the printing process are generally the same as those described in FIG. 4.

Unlike the conveyance pattern in FIG. 5A, the conveyance pattern in FIG. 14A uses all nozzles of the cyan head unit 12C in all pass processes. Further, the conveying distances for conveying processes between pass processes are "7, 7, 25." As shown in the example of FIG. 14A, dots dt can be formed on all lines beginning from the position of the fifth nozzle in the first pass process P1 and continuing downstream in the first direction D1. Therefore, the line on which dots dt are formed by the fifth nozzle in the first pass process P1 is treated as the first line.

In the example of FIG. 14A, dots are formed on all lines within the first unit region A1 through three consecutive pass processes P1-P3. A conveying process to convey the recording medium a distance of 7 dots is performed between the first and second pass processes P1 and P2 and between the second and third pass processes P2 and P3. The first unit region A1 is a continuous partial region configured of 25 lines, from the first line to the twenty-fifth line. Dots can additionally be formed in some of the lines from the twenty-sixth through forty-first lines during the three pass processes P1-P3, In this way, dots can be formed in the first three pass processes P1, P2, and P3 over a broader region than the unit region described in FIGS. 5 and 11.

Following the third pass process P3, a conveying process is performed at a larger conveying distance F3 (25 dots). After this conveying process, three more pass processes P4-P6 are performed in the same way as the pass processes P1-P3 described above. In the three pass processes P4-P6, dots dt can be formed in all lines of the second unit region A2 configured of 25 lines, from the fortieth line to the sixty-fourth line. In the three pass processes P4-P6, dots can be formed in an even broader region that includes both sides of the second unit region A2 in the conveying direction DF and the first direction D1. Dots dt in the area between the first unit region A1 and second unit region A2, for example, are formed through the four pass processes P2-P5.

Thereafter, the process described above is repeatedly performed, while alternating between (1) three pass processes with a conveying process of the regular conveying distance performed between consecutive pass processes, and (2) a conveying process of a larger conveying distance. As described above, the three pass processes performed around the conveying processes of the regular conveying distance can be used to form dots in a broader region than the unit region described in FIGS. 5 and 11. Hereinafter, the dot formation process performed with three pass processes will be called an "expanded unit print."

The head units 12M, 12Y, and 11Ka form dots in the other ink colors magenta, yellow, and black in the same way as the cyan head unit 12C. As described with reference to FIG. 7, all three black head units 11Ka, 11Kb, and 11Kc may be used to form black dots on a plurality of lines spaced at the printing resolution through a single pass process.

In FIG. 14A, dots dt in the first unit region A1 that are formed by the sixth nozzle have been shaded. In the example of FIG. 14A, the sixth nozzle is used to form dots dt in the fourth, eleventh, and eighteenth lines. Thus, the lines in which dots dt are formed by one nozzle are spaced apart from each other, thereby mitigating the effects of nozzle defects on image quality.

FIG. 14B shows an example of a conveyance pattern for skipping blank regions Ab. As in the example of FIG. 5B, the blank region Ab in FIG. 14B begins from the fiftieth line. Printing up to the forty-ninth line is completed through the sixth pass process P6. When skipping a blank region Ab, the conveying distance F6 is adjusted for the conveying process performed between the sixth pass process P6 and seventh pass process P7. As described with reference to FIG. 14A, printing can be performed along the first direction D1 from the position of the fifth nozzle when beginning a new pass process. Therefore, the first data generation unit 241 sets the conveying distance F6 such that the ninth nozzle in the seventh pass process P7 is aligned with the $80^{th}$ line, i.e., the line following the last line ($79^{th}$ line) of the blank region Ab in the first direction D1. Thus, the first data generation unit 241 changes the conveying distance F6 from its normal 25 dots to 27 dots.

FIG. 15 is a flowchart illustrating steps in a print data generating process according to the fourth embodiment. In the fourth embodiment, the selection unit 249 selects a conveyance pattern based on the existence of a defective nozzle. Possible conveyance patterns included the first nonuniform partial nozzle pattern of FIG. 5 and the conveyance pattern of FIG. 14 (hereinafter called the "nonuniform total nozzle pattern").

In S200a at the beginning of the print data generation process of FIG. 15, the selection unit 249 references defective nozzle data as described in S200 of FIG. 12 to identify any defective nozzles. In S250 the selection unit 249 determines whether all nozzles in the head unit being used for printing are normal. If the head unit used for printing possesses a defective nozzle (S250: NO), in S260 the selection unit 249 selects the first nonuniform partial nozzle pattern (i.e., the first data generation unit 241). As in the example of FIG. 8, the first data generation unit 241 selected in S260 executes steps S280, S285, S290, and S295 to generate print data in this case. Note that the first data generation unit 241 generates print data according to the first nonuniform partial nozzle pattern of FIG. 5. However, the first data generation unit 241 may also use the second nonuniform partial nozzle pattern of FIG. 11. Alternatively, the conveyance pattern may be selected according to the method described in FIG. 12.

If all nozzles in the head unit being used for printing are normal (S250: YES), in S255 the selection unit 249 selects the nonuniform total nozzle pattern shown in FIG. 14. In the fourth embodiment, the third data generation unit 243 (see FIG. 1) generates print data based on the nonuniform total nozzle pattern. The third data generation unit 243 generates print data by executing steps S280, S285, S290, and S295 based on the nonuniform total nozzle pattern.

S280 is the same process when performed by the third data generation unit 243 and the first data generation unit 241. The third data generation unit 243 executes the process in S285 as described with reference to FIG. 14B. The amount of printing time reduced by skipping blank regions is less than that when using a nonuniform partial nozzle pattern, but the nonuniform total nozzle pattern can suppress an increase in required printing time by using all nozzles in all pass processes.

Step S290 may be omitted when using the third data generation unit 243. In this case, the third data generation unit 243 simply sets the movement direction of the print head 320 for each pass process so that the direction is alternated between the right direction DR and left direction DL. However, the third data generation unit 243 may also set the movement direction for each pass process based on the ink usage amounts, as described in the example of FIG. 10. For example, the third data generation unit 243 may set the movement direction to a prescribed direction (the right direction DR, for example) when the movement direction of the pass process prints a line having an ink usage amount that exceeds the prescribed threshold. The third data generation unit 243 may also set the movement directions by partial regions configured of a plurality of consecutive lines.

In S295 the third data generation unit 243 generates print data based on the conveyance pattern and the movement directions of the pass processes. Hereinafter, print data generated by the third data generation unit 243 will be called the "drive control data."

In the fourth embodiment described above, the selection unit 249 selects one of the first data generation unit 241 and third data generation unit 243 to generate print data, based on the existence of a defective nozzle. Therefore, the multifunction peripheral 100 can perform a printing process that is suitable to either the case in which the head unit used for printing possesses a defective nozzle or the case in which the head unit does not possess a defective nozzle. For example, supposing that a nonuniform partial nozzle pattern is used for cases in which a defective nozzle does not exist, the time required for printing using the nonuniform partial nozzle pattern would be greater than the time required when using a nonuniform total nozzle pattern. Similarly, assuming a nonuniform total nozzle pattern is used for printing when a defective nozzle exists, it is more probable that the defective nozzle would be used with higher frequency than when employing a nonuniform partial nozzle pattern, resulting in lower image quality. In the fourth embodiment, the multifunction peripheral 100 can mitigate these shortcomings.

E. Variations of the Embodiments

While the invention has been described in detail with reference to the embodiments thereof, it would be apparent to those skilled in the art that various changes and modifications may be made therein without departing from the spirit of the invention.

(1) The first pitch K1, nozzle number L, and printing resolution in the first direction D1 described in the embodiments may be combined in various ways. For example, the first pitch K1 may be set to a multiple P (where P is an integer of 2 or greater) of the distance between dots in the first direction D1 (i.e., the printing resolution). In this case, P pass processes may be employed in a single unit print according to the conveyance patterns of FIGS. 5 and 11. Note that if P is an even number, step S290 may be omitted from FIGS. 8, 12, 13, and 15 since the pattern of movement directions for the P pass processes is common for each of the plurality of unit regions. In the conveyance patterns of FIGS. 5 and 11, the conveying distance used in conveying processes performed between consecutive pass processes for a single unit print is not limited to 4 dots, in the case of FIG. 5, or 7 dots, in the case of FIG. 11, but may be a number that is relatively prime with the first pitch K1. In addition, the conveying distance may be varied between consecutive pass processes during a single unit print. In any case, nozzles positioned outside the target unit region may be employed in each pass process.

Similarly, the conveying distance used in the conveyance pattern of FIG. 9 is not limited to 13 dots, but may be a value that is relatively prime with the first pitch K1. In addition, P pass processes interwoven with conveying processes at the regular conveying distance may be employed in the conveyance pattern of FIG. 14. Here, the conveying distance of conveying processes performed between the P consecutive pass processes is not limited to 7 dots, but may be a value that is relatively prime with the first pitch K1.

(2) The print data generating process may be modified in many ways and is not limited to the processes described in FIGS. 8, 12, 13, and 15. For example, steps S280 and S285 for skipping blank regions may be omitted. Further, when controlling the order that ink colors are superposed in S290, the print data generation unit 200 may set each of the movement directions for a plurality of pass processes used to print a unit region to the same direction (the right direction DR, for example). Alternatively, step S290 may be omitted. Further, the print data generated in this process may be data for implementing unidirectional printing rather than bi-directional printing. For example, the movement directions of all pass processes used to form ink dots may be set uniformly to the right direction DR. In this case, a process must be performed between each pass process to move the print head 320 in the left direction DL without printing ink dots.

(3) The configuration of the printing unit 300 is not limited to that shown in FIGS. 2 and 3, but may be modified in various ways. For example, the second black head unit 11Kb and third black head unit 11Kc may be eliminated so that the print head 320 is provided with only four head units: the head units 11Ka, 12Y, 12C, and 12M. Further, the printing unit 300 may employ ink of any color, such as red ink, and is not limited to the colors cyan, magenta, yellow, and black. Further, the printing unit 300 is not limited to using four types of ink, but may employ Q types (where Q is an integer of 1 or greater).

(4) While the print controller 190 and the printing unit 300 are built into the same device in the example shown in FIG. 1, these components may be provided in different devices that are completely separated from each other. For example, the functions of the print controller 190 may be implemented through a digital camera, scanner, mobile telephone, and personal computer.

The functions of the control-processing unit 200 may be shared among a plurality of devices (computers, for example) capable of communicating over a network so that the devices as a whole can provide the functions of the control-processing unit 200 (here, the system comprising the devices can be called either the print data generation device or the print controller). Similarly, the functions of the acquisition unit 260, print data generation unit 200, and data transmission unit 250 may be shared among a plurality of devices (computers, for example) capable of communicating over a network so that the devices as a whole can provide the functions of the acquisition unit 260, print data generation unit 200, and data transmission unit 250 (here, the system comprising the devices can be called the print controller).

Part of the configuration implemented in hardware in the embodiments may be replaced with software and, conversely, all or part of the configuration implemented in software in the embodiments may be replaced with hardware. For example, the functions of the control-processing unit 200 in FIG. 1 may be implemented by dedicated hardware configured of logic circuits.

When all or part of the functions of the present invention are implemented with computer programs, the programs can be stored on a computer-readable storage medium (a non-temporary storage medium, for example). The programs may be used on the same storage medium on which they were supplied or transferred to a different storage medium (computer-readable storage medium). The "computer-readable storage medium" may be a portable storage medium, such as a memory card or CD-ROM; an internal storage device built into the computer, such as any of various ROM or the like; or an external storage device, such as a hard disk drive, connected to the computer.

What is claimed is:

1. A print controller configured to control a print executing unit, the print executing unit having a print head in which L number of first nozzles are arranged in a first direction, L being an integer of 2 or greater, a nozzle pitch in the first direction between neighboring first nozzles of the L number of first nozzles being set to a first predetermined nozzle pitch, the print controller comprising:
   an acquiring unit configured to acquire image data; and
   a print data generating unit configured to generate print data based on the image data, the print data generating unit including a first drive control data generating unit configured to generate first drive control data based on the image data as the print data, the first drive control data causing the print executing unit to satisfy (a)-(d), as follows:
   (a) the print executing unit executes a printing process for a plurality of unit regions by alternately repeating a first unit printing process and a first moving process, the plurality of unit regions being defined in a printing medium and arranged in the first direction, each unit region having a prescribed length in the first direction, wherein each first unit printing process includes:
      N number of pass processes for forming dots to form a plurality of lines on one of the plurality of unit regions, N being an integer of 2 or greater, each of the plurality of lines extending in a second direction orthogonal to the first direction and including at least one dot arranged in the second direction, wherein, in each of the N number of pass processes, the print head moves in the second direction relative to the printing medium to form dots on the printing medium along at least one line of the plurality of lines; and
      a second moving process in which the print head moves in the first direction relative to the printing medium within a period of time after a ath pass process of the N number of pass processes has been executed and before a (a+1)th pass process of the N number of pass processes is executed, a being an integer from one to (N−1), a line pitch in the first direction between neighboring lines of the plurality of lines being one N-th of the nozzle pitch of the first nozzles;
   wherein the print executing unit executes, each time N pass processes have been executed in one first unit printing process, the first moving process in which the print head moves in the first direction relative to the printing medium;

(b) at least one of the L number of first nozzles is unused for forming dots on the printing medium in each of the N number of pass processes;
   (c) combinations of the first nozzles used for forming dots on the printing medium in the N number of pass processes are different from one another; and
   (d) a movement distance of the print head relative to the printing medium when the first moving process is executed once is different from a movement distance of the print head relative to the printing medium when the second moving process is executed once.

2. The print controller according to claim 1, wherein the first drive control data causes the print executing unit to further satisfy (e) which includes, in each of the N number of pass processes, at least one nozzle of the L number of first nozzles facing a region outside of the one unit region is unused for forming dots on the printing medium, remaining nozzles of the L number of first nozzles facing the one unit region is used for forming dots on the printing medium.

3. The print controller according to claim 1, further comprising a determining unit configured to determine whether or not an image represented by the image data includes a blank region based on the image data, the blank region being a continuous region in which no dot should be formed;
   wherein, if the image includes the blank region, the first drive control data generating unit generates the first drive control data based on the image data, the first drive control data causing the print executing unit to further satisfy:
   (e) if a part of the blank region is positioned in a jth unit region of the plurality of unit regions, the print executing unit adjusts the movement distance of the print head relative to the printing medium between the jth unit region and a (j+1)th unit region, j being an integer of 1 or greater; and
   (f) wherein the print executing unit executes the first moving process in which the print head moves the adjusted movement distance in the first direction relative to the printing medium.

4. The print controller according to claim 1, wherein the first drive control data causes the print executing unit to further satisfy (e) which includes the print head moving a constant movement distance in the first direction relative to the printing medium if the second moving process is executed within the period of time after the ath pass process of the N number of pass processes has been executed and before the (a+1)th pass process of the N number of pass processes is executed.

5. The print controller according to claim 1, further comprising the print executing unit having the L number of first nozzles through which droplets of first ink are ejected to form dots, the nozzle pitch of the L number of first nozzles in the first direction being set to the first predetermined nozzle pitch;
   wherein the print head further has (N×L) number of second nozzles through which droplets of second ink are ejected to form dots, a nozzle pitch in the first direction between neighboring second nozzles of the (N×L) number of second nozzles being set to a second predetermined nozzle pitch, the second predetermined nozzle pitch being obtained by dividing the first predetermined nozzle pitch by N.

6. The print controller according to claim 5, wherein the first drive control data causes the print executing unit to further satisfy (e) which includes, in one of the N pass processes, at least part of the (N×L) number of second nozzles is used for forming dots to form a plurality of second lines on the printing medium, each of the plurality of second lines extending in the second direction and including at least one dot with the second ink arranged in the second direction, the plurality of second lines being arranged in the first direction at the second predetermined nozzle pitch.

7. The print controller according to claim 1, further comprising an identifying unit configured to identify a defective nozzle from among the L number of first nozzles;
wherein, if the identifying unit identifies a defective nozzle, the first drive control data generating unit generates the first drive control data causing the print executing unit to further satisfy (e) which includes the defective nozzle being unused for forming dots on the printing medium in at least one of the N number of pass processes.

8. The print controller according to claim 1, further comprising the print executing unit having the L number of first nozzles through which droplets of first ink are ejected to form dots;
wherein the print head further has L number of second nozzles through which droplets of second ink are ejected to form dots, each of the L number of second nozzles corresponding to one of the L number of first nozzles, each of the L number of second nozzles being positioned at a same position in the first direction as the corresponding one of the L number of first nozzles;
wherein the first drive control data generating unit is configured to generate the first drive control data causing the print executing unit to further satisfy: (e) which includes, in each of the N number of pass processes, the print executing unit forming the dots of first ink and the dots of the second ink on the printing medium.

9. The print controller according to claim 1, further comprising the print executing unit having the L number of first nozzles through which droplets of ink are ejected to form dots;
wherein the first drive control data generating unit is further configured to set, based on an amount of ink that should be used for executing one instance of the first unit printing process for one of the unit regions, a movement direction of the print head for each of the N number of pass processes to one of two directions parallel to the second direction;
wherein the first drive control data generating unit is configured to generate the first drive control data causing the print executing unit to further satisfy (e) which includes, in each of the N number of pass processes, the print head moves in the one of two directions relative to the printing medium.

10. The print controller according to claim 1, wherein the print data generating unit further includes a second drive control data generating unit configured to generate second drive control data based on the image data as the print data, the second drive control data causing the print executing unit to satisfy (e) and (f), as follows:
(e) the print executing unit executes a printing process for an entirety of the printing medium by repeating:
the N number of pass processes in which the print head moves in the second direction relative to the printing medium to form the plurality of lines in one of the unit regions, each of the plurality of lines including dots arranged in the second direction; and
a third moving process in which the print head moves a constant distance in the first direction relative to the printing medium within a period of time after each of the N number of pass processes has been executed and before one pass process subsequent to the each of the N number of pass processes is executed; and
(f) all of the L number of first nozzles are used for forming dots on the printing medium in each of the N number of pass processes.

11. The print controller according to claim 10, further comprising a transmitting unit configured to transmit the print data to the print executing unit, the print data being one of the first drive control data and the second drive control data.

12. The print controller according to claim 1, wherein the print data generating unit further includes a second drive control data generating unit configured to generate second drive control data based on the image data as the print data, the second drive control data causing the print executing unit to satisfy (e) and (f), as follows:
(e) the print executing unit executes a printing process by alternately repeating an expanded unit printing process and a third moving process,
wherein each expanded unit printing process includes:
the N number of pass processes for forming dots in an expanded unit region to form a plurality of lines each extending in the second direction, in each pass process the print head moving in the second direction relative to the printing medium to form dots, each of the plurality of lines including dots arranged in the second direction, the expanded unit region being defined in the printing medium and having a length in the first direction longer than the prescribed length; and
a fourth moving process in which the print head moves in the first direction relative to the printing medium within a period of time after the ath pass process of the N number of pass processes has been executed and before the (a+1)th pass process of the N number of pass processes is executed, a being an integer from one to (N−1), a line pitch in the first direction between neighboring lines of the plurality of lines being one N-th of the nozzle pitch of the first nozzles;
wherein the print executing unit executes, each time N pass processes have been executed in the one expanded unit printing process, the third moving process in which the print head moves in the first direction relative to the printing medium;
(f) all of the L number of first nozzles are used for forming dots on the printing medium in each of the N pass processes; and
(g) a movement distance of the print head relative to the printing medium when the third moving process is executed once is different from a movement distance of the print head relative to the printing medium when the fourth moving process is executed once.

13. The print controller according to claim 12, further comprising a transmitting unit configured to transmit the print data to the print executing unit, the print data being one of the first drive control data and the second drive control data.

14. A non-transitory computer readable storage medium storing a set of program instructions installed on and executed by a computer configured to control a print executing unit, the print executing unit having a print head in which L number of first nozzles are arranged in a first direction, L being an integer of 2 or greater, a nozzle pitch in the first direction between neighboring first nozzles of the L number of first nozzles being set to a first predetermined nozzle pitch, the program instructions comprising:
acquiring image data; and
generating print data based on the image data causing the print executing unit to satisfy (a)-(d), as follows:

(a) the print executing unit executes a printing process for a plurality of unit regions by alternately repeating a first unit printing process and a first moving process, the plurality of unit regions being defined in a printing medium and arranged in the first direction, each unit region having a prescribed length in the first direction, wherein each first unit printing process includes:

N number of pass processes for forming dots to form a plurality of lines on one of the plurality of unit regions, N being an integer of 2 or greater, each of the plurality of lines extending in a second direction orthogonal to the first direction and including at least one dot arranged in the second direction, wherein, in each of the N number of pass processes, the print head moves in the second direction relative to the printing medium to form dots on the printing medium along at least one line of the plurality of lines; and a second moving process in which the print head moves in the first direction relative to the printing medium within a period of time after a ath pass process of the N number of pass processes has been executed and before a (a+1)th pass process of the N number of pass processes is executed, a being an integer from one to (N−1), a line pitch in the first direction between neighboring lines of the plurality of lines being one N-th of the nozzle pitch of first nozzles;

wherein the print executing unit executes, each time N pass processes have been executed in one first unit printing process, the first moving process in which the print head moves in the first direction relative to the printing medium;

(b) at least one of the L number of first nozzles is unused for forming dots on the printing medium in each of the N number of pass processes;

(c) combinations of the first nozzles used for forming dots on the printing medium in the N number of pass processes are different from one another; and (d) a movement distance of the print head relative to the printing medium when the first moving process is executed once is different from a movement distance of the print head relative to the printing medium when the second moving process is executed once.

* * * * *